US011487037B2

(12) United States Patent
Therrien et al.

(10) Patent No.: US 11,487,037 B2
(45) Date of Patent: Nov. 1, 2022

(54) WELL MONITORING VIA DISTRIBUTED ACOUSTIC SENSING SUBSYSTEM AND DISTRIBUTED TEMPERATURE SENSING SUBSYSTEM

(71) Applicant: Halliburton Energy Services, Inc., Houston, TX (US)

(72) Inventors: Jason Edward Therrien, Cypress, TX (US); Mikko Jaaskelainen, Katy, TX (US); Yijie Shen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 216 days.

(21) Appl. No.: 16/770,223

(22) PCT Filed: Jan. 9, 2018

(86) PCT No.: PCT/US2018/013010
§ 371 (c)(1),
(2) Date: Jun. 5, 2020

(87) PCT Pub. No.: WO2019/139564
PCT Pub. Date: Jul. 18, 2019

(65) Prior Publication Data
US 2021/0173111 A1 Jun. 10, 2021

(51) Int. Cl.
*G01V 1/40* (2006.01)
*E21B 47/07* (2012.01)
(Continued)

(52) U.S. Cl.
CPC ............... *G01V 1/40* (2013.01); *E21B 47/07* (2020.05); *G01D 5/268* (2013.01); *G01H 9/004* (2013.01); *G01K 11/32* (2013.01)

(58) Field of Classification Search
CPC .......... G01V 1/40; G01V 1/208; G01V 1/226; G01V 1/42; G01V 1/52; G01V 2210/1234;
(Continued)

(56) References Cited

U.S. PATENT DOCUMENTS

| 6,724,687 B1 | 4/2004 | Stephenson et al. |
| 2012/0127459 A1 | 5/2012 | Handerek |

(Continued)

OTHER PUBLICATIONS

Ramurthy et al., Fiber-Optics Results From An Intra-Stage Diversion Design Completions Study in the Niobrara Formation of DJ Basin, Feb. 9-11, 2016, SPE Hydraulic Fracturing Technology Conference, The Woodlands, Texas, 16 pp. (Year: 2016).*
(Continued)

*Primary Examiner* — Toan M Le
(74) *Attorney, Agent, or Firm* — Delizio, Peacock, Lewin & Guerra

(57) ABSTRACT

A production monitoring system includes a distributed acoustic sensing subsystem that includes a first optical fiber for a distributed acoustic sensing signal and a distributed temperature sensing subsystem that includes a second optical fiber for a distributed temperature sensing signal. The production monitoring system, also includes a cable positioned in a wellbore penetrating through one or more subterranean formations. The distributed acoustic sensing subsystem is communicatively coupled to the cable through the distributed temperature sensing subsystem. The cable includes one or more optical fibers used to obtain optical
(Continued)

fiber measurements pertaining to the distributed acoustic sensing signal and the distributed temperature sensing signal. The optical fibers include a sensing fiber that is common between the distributed acoustic sensing subsystem and the distributed temperature sensing subsystem. The distributed acoustic sensing subsystem, receives at least a portion of the optical fiber measurements from the sensing fiber through the distributed temperature sensing subsystem.

20 Claims, 12 Drawing Sheets

(51) Int. Cl.
  *G01D 5/26* (2006.01)
  *G01H 9/00* (2006.01)
  *G01K 11/32* (2021.01)
(58) Field of Classification Search
  CPC ......... G01V 2210/1429; G01V 11/002; G01V 8/16; G01K 11/32; G01D 5/268; G01H 9/004; E21B 47/07; E21B 47/107; E21B 47/113; E21B 47/135
  See application file for complete search history.

(56) References Cited

U.S. PATENT DOCUMENTS

| | | |
|---|---|---|
| 2013/0167628 A1 | 7/2013 | Hull et al. |
| 2016/0251957 A1 | 9/2016 | McEwen-King et al. |
| 2016/0341841 A1 | 11/2016 | Barfoot et al. |
| 2017/0260846 A1 | 9/2017 | Jin et al. |

OTHER PUBLICATIONS

PCT Application Serial No. PCT/US2018/013010, International Search Report, dated Sep. 28, 2018, 4 pages.

PCT Application Serial No. PCT/US2018/013010, International Written Opinion, dated Sep. 28, 2018, 5 pages.

Gudmundsson, et al., "Gas-Liquid metering using pressure-pulse technology", SPE Annual Technical Conference and Exhibition, Oct. 3-6, 1999, Houston, Texas, USA, Society of Petroleum Engineers, 10 pages.

Paleja, et al., "Velocity Tracking for Flow Monitoring and Production Profiling Using Distributed Acoustic Sensing", SPE Annual Technical Conference and Exhibition, Sep. 28-30, 2015, Houston, Texas, USA, Society of Petroleum Engineers, 16 pages.

* cited by examiner

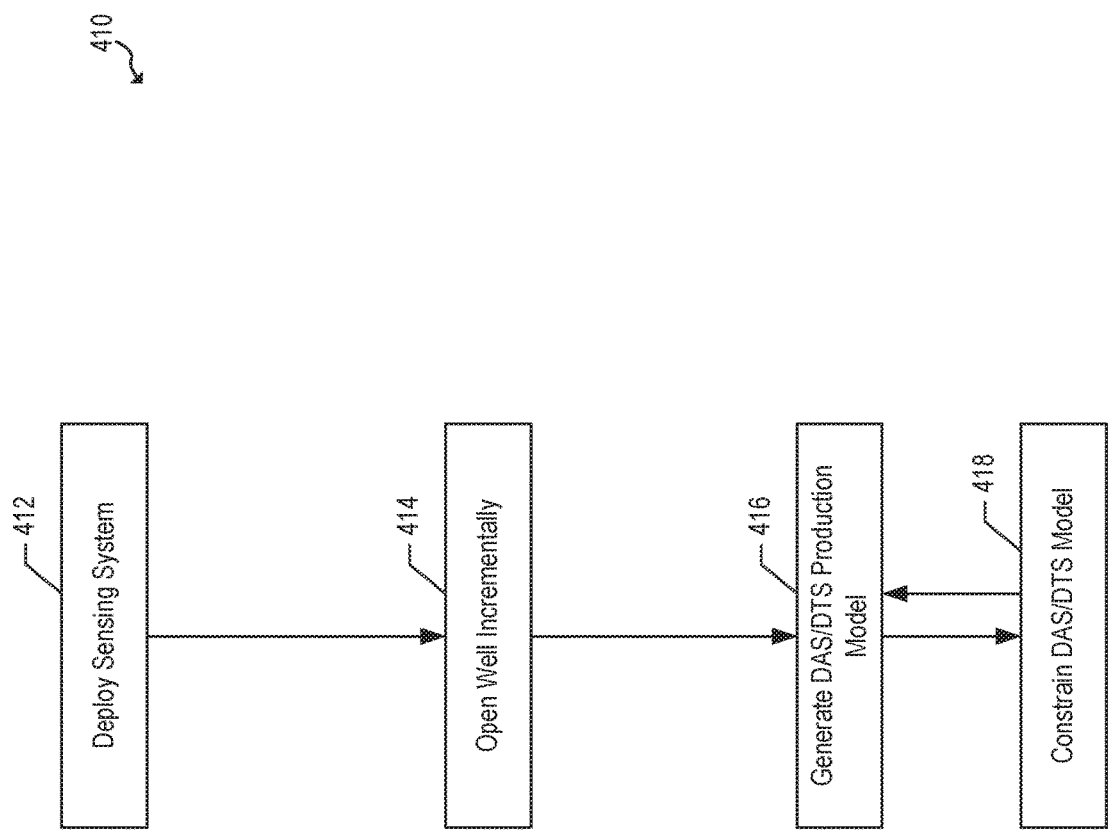

WELL MONITORING VIA DISTRIBUTED ACOUSTIC SENSING SUBSYSTEM AND DISTRIBUTED TEMPERATURE SENSING SUBSYSTEM

TECHNICAL FIELD

The present disclosure relates to downhole flow measurement systems, and more particularly to systems and methods for production monitoring.

BACKGROUND

Distributed sensing technology may be suitable for various downhole applications ranging from temperature sensing to passive seismic monitoring. Reflections of an optical signal transmitted downhole into a wellbore through an optical sensing optical fiber can propagate back toward an optical receiver and the reflections can be analyzed to determine a condition in the wellbore.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

FIG. 4B illustrates another example of a process for production monitoring using the distributed acoustic sensing system multiplexed through the distributed temperature sensing system in accordance with one or more implementations.

DETAILED DESCRIPTION

The present disclosure provides for enabling high resolution temperature measurements suitable for flow monitoring along the wellbore in deviated and horizontal wells where thermal differences between the geothermal gradient and fluid flow from the reservoir is small. High quality temperature measurements are critical in horizontal wells, where the thermal properties between e.g. oil and water are very small, and these measurements should be accurate with high resolution in order to model multi-phase fluid flow along a horizontal wellbore.

The subject technology provides several advantages over traditional production monitoring systems, for example, by deriving flow information from horizontal wellbores using high resolution temperature measurements based on a measured low frequency signal from a coherent phase based Distributed Acoustic Sensing System (DAS) with a second high accuracy low frequency signal from a Raman scattering based Distributed Temperature Sensing (DTS) system to correct for system drift. Both the DTS and DAS signals pass through a common reference coil using a common sensing fiber, and the baseline drift of the low frequency DAS signal can be removed using the DTS data. Flow condition changes that may be monitored by the subject system during production include changes of flow rate and fluid properties. In the subject system, high resolution temperature sensing combined with acoustic sensing provides an integrated monitoring method of flow conditions for production in deviated and horizontal wells. The subject system further utilizes flow condition event detection to constrain the production monitoring model.

The subject technology relates to production monitoring and includes deploying a distributed sensing subsystem into a wellbore penetrating one or more subterranean formations, the distributed sensing subsystem comprising a distributed acoustic sensing subsystem communicatively coupled to a common sensing fiber positioned downhole in the wellbore through a distributed temperature sensing subsystem. A downhole measurement can be obtained from the common sensing fiber. A trigger event based on a change between the downhole measurement and a reference measurement is determined and a predetermined workflow based on the determined trigger event is then initiated. Flow information in the wellbore is then determined based on the predetermined workflow.

As used herein, the terms "single-mode fiber" and "SMF" are interchangeable with the term "single-mode optical fiber," and the terms "multi-mode fiber" and "MMF" are interchangeable with the term "multi-mode optical fiber," without departing from the scope of the present disclosure.

Figure 1A:
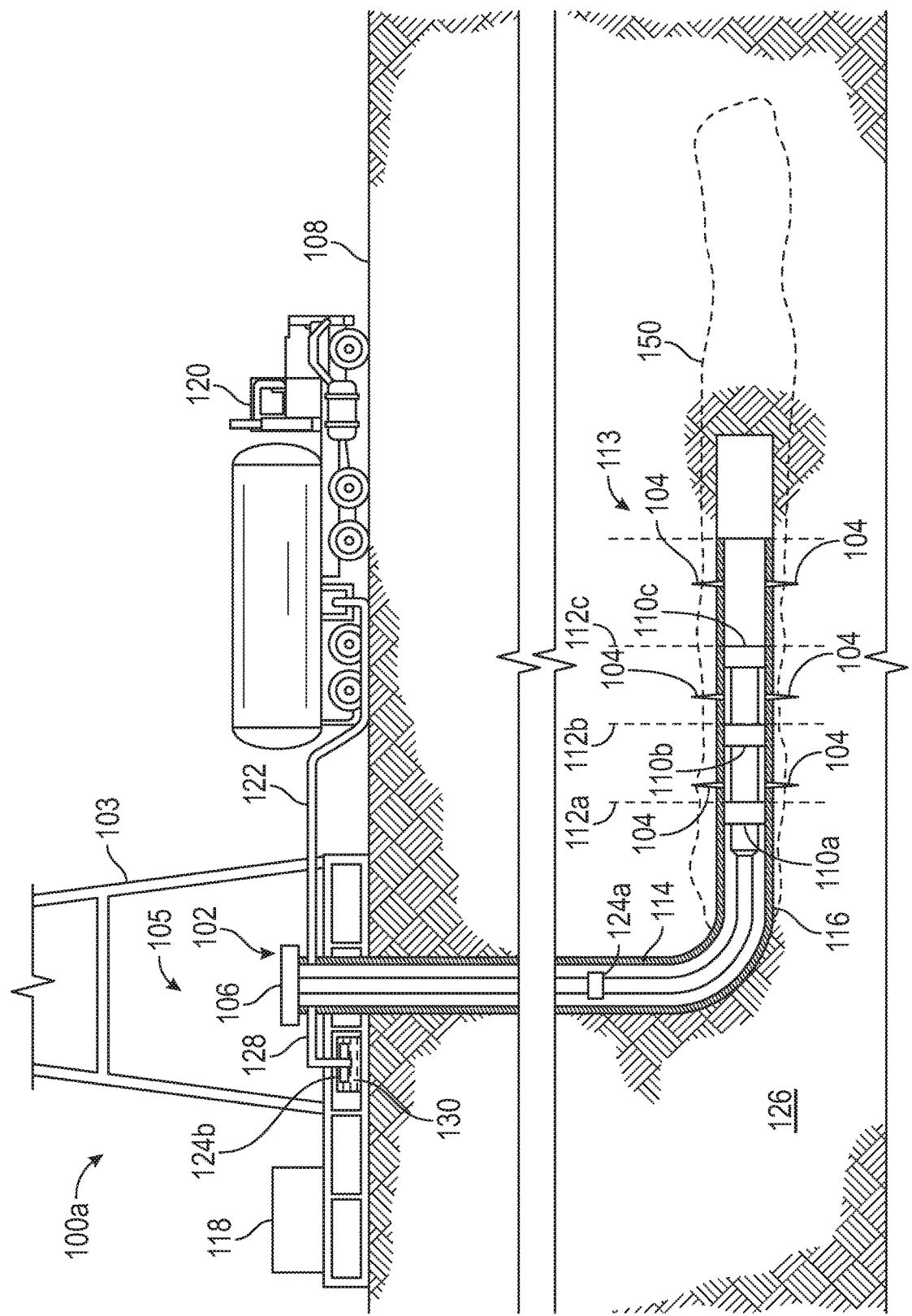
FIG. 1A illustrates a well system that can employ the principles of the present disclosure in accordance with one or more implementations.

FIG. 1A illustrates an exemplary well monitoring and measurement system 100a that may employ the principles of the present disclosure in accordance with one or more implementations. It may be noted that the well monitoring and measurement system 100a can be used in a land-based operation as well as in any sea-based or sub-sea application including a floating platform or sub-surface wellhead installation, as generally known in the art. The well monitoring and measurement system 100a can also include additional or different features that are not shown in FIG. 1A. For example, the well monitoring and measurement system 100a can include additional drilling system components, wireline logging system components, production system components, completion system components, or other components. In the present disclosure, distributed sensing systems may be permanently installed and connected to a sensing fiber with the objective of monitoring production and flow rates over time.

Horizontal drilling techniques for forming a wellbore often include vertically drilling from a surface location to a desired subterranean depth, from which point, drilling is curved or at a sub-terrain plane approximately horizontal to the surface to connect the wellbore to multiple hydrocarbon deposits. Once the wellbore and support structures have been formed, a perforating gun is lowered down the wellbore and is detonated at multiple locations of the wellbore to generate explosions into the wellbore to create a plurality of perforations along rock formations surrounding the wellbore. A fracking fluid is pumped into the wellbore to create and to augment fractures in the rock formations surrounding the perforations. The fracking fluid may also include particles that help to preserve the structural integrity of the perforations and surrounding fractures during operation of the well.

As illustrated, the well monitoring and measurement system 100a may include a service rig 103 that is positioned on the earth's surface 108 and extends over and around a wellbore 114 that penetrates a subterranean formation 126. The service rig 103 may be a drilling rig, a completion rig, a workover rig, a production rig, or the like. In some embodiments, the service rig 103 may be omitted and replaced with a standard surface wellhead completion or installation, without departing from the scope of the disclosure. Moreover, while the well monitoring and measurement system 100a is depicted as a land-based operation, it will be appreciated that the principles of the present disclosure could equally be applied in any sea-based or sub-sea application where the service rig 103 may be a floating platform, a semi-submersible platform, or a sub-surface wellhead installation as generally known in the art.

The wellbore 114 may be drilled into the subterranean formation 126 using any suitable drilling technique and may extend in a substantially vertical direction away from the earth's surface 108 over a vertical wellbore portion. At some point in the wellbore 114, the vertical wellbore portion may deviate from vertical relative to the earth's surface 108 and transition into a substantially horizontal portion 113. In other embodiments, however, the casing string may be omitted from all or a portion of the wellbore 114 and the principles of the present disclosure may equally apply to an "open-hole" environment.

The well monitoring and measurement system 100a may further include a wellbore isolation device that may be conveyed into the wellbore 114 on a tool string 116 that extends from the service rig 103. As described in greater detail below, the wellbore isolation device may operate as a type of casing or borehole isolation device, such as a fracture plug, a bridge plug, a wellbore packer, a wiper plug, a cement plug, or any combination thereof. The tool string 116 that delivers the wellbore isolation device downhole may be, but is not limited to, casing, coiled tubing, intelligent coiled tubing, hybrid coiled tubing, drill pipe, tubing, wireline, slickline, an electric line, or the like. As shown in FIG. 1A, the well monitoring and measurement system 100a includes multiple wellbore isolation devices 110a. 110b, and 110c.

Each of the wellbore isolation devices 110a. 110b. 110c may be conveyed downhole to a target location (e.g., 150) within the wellbore 114. In some embodiments, each of the wellbore isolation devices (e.g., 110a, 110b, 110c) is pumped to the target location using hydraulic pressure applied from the service rig 103 at the earth's surface 108. In such embodiments, the tool string 116 serves to maintain control of each of the wellbore isolation devices (e.g., 110a, 110b, 110c) as it traverses the wellbore 114 and may provide power to actuate and set the wellbore isolation devices (e.g., 110a, 110b, 110c) upon reaching the target location. In other embodiments, each of the wellbore isolation devices (e.g., 110a, 110b, 110c) freely falls to the target location under the force of gravity to traverse all or part of the wellbore 114. At the target location, the wellbore isolation device (e.g., 110a, 110b, 110c) may be actuated or "set" to seal the wellbore 114 and otherwise provide a point of fluid isolation within the wellbore 114.

It will be appreciated by those skilled in the art that even though FIG. 1 depicts the wellbore isolation devices (e.g., 110a. 110b, 110c) as being arranged and operating in the horizontal portion of the wellbore 114, the embodiments described herein are equally applicable for use in portions of the wellbore 114 that are vertical, deviated, or otherwise slanted. Moreover, use of directional terms such as above, below, upper, lower, upward, downward, uphole, downhole, and the like are used in relation to the illustrative embodiments as they are depicted in the figures, the upward or uphole direction being toward the top of the corresponding figure and the downward direction being toward the bottom of the corresponding figure, the uphole direction being toward the surface of the well and the downhole direction being toward the toe of the well.

As shown in FIG. 1A, the wellbore isolation devices 110a, 110b, and 110c are respectively positioned at zone boundaries of zones 112a, 112b, and 112c of a wellbore 114 to isolate each of the first, second, and third zones 112a, 112b, and 112c from other portions of the wellbore 114. The wellbore 114 extends from surface 108 of the well head 102, through formation 126, to target region 150. The target region 150 includes the first zone 112a, second zone 112b, and third zone 112c, and may be formed to include additional zones or fewer zones. A tool string 116 is deployed within the wellbore 114. The tool string 116 is operable to supply pressurized fluid to each of the first zone 12a, the second zone 112b, and the third zone 112c to expand perforations 104 at each respective zone.

At the wellhead 106, an inlet conduit 122 is coupled to a fluid source 120 to provide a pressurized wellbore fluid to the well head 102. For example, the pressurized wellbore fluid may be pumped through the inlet conduit 122, down the wellbore 114 and into the third zone 112c to fracture the perforations 104 of the zone. Following the fracking operation, the wellbore isolation device 110c is deployed proximate to the boundary of the third zone 112c to seal and isolate the third zone 112c from other portions of the wellbore 114. The process is then repeated for the second zone 112b and subsequently the first zone 112a, using wellbore isolation devices 110b and 110a, respectively to isolate the second zone 112b and first zone 112a.

Subsequently, fluid may be circulated into the well head 102 through the tool string 116 and back toward the surface 108 through an annulus between the outer wall of the tool string 116 and the wall of the wellbore to continue completion efforts. To that end, a diverter or outlet conduit 128 may be connected to a container 130 at the wellhead 106 to provide a fluid return flow path from the wellbore. The wellbore isolation devices 110*a*, 110*b*, and 110*c* may be configured to dissolve upon prolonged exposure to wellbore fluids, including upon exposure to certain solvents that may be included in the wellbore fluid. In such embodiments, the components of the isolation device may be water-soluble (aqueous medium), oil-soluble, or soluble in the presence of other solvent fluids, such as, but not limited to alcohol based fluids, acetone based fluids, and propanediol based fluids.

When fluid is circulated in the well, the return fluid flow path carries debris and particulate from the wellbore, including remnants of dissolved wellbore isolation devices, following dissolution. Such remnants may include insoluble parts, such as tracers or trackers that may be carried in the pressurized wellbore fluid along the fluid return flow path where they are collected in the container 130. In one or more implementations, inline detector 124*a* and collection container detector 124*b* are placed downhole and at the surface 108, respectively, to detect tracers of the wellbore isolation device as they pass by the detectors 124*a* and 124*b*.

In some implementations, operations of the well head 102 is monitored by surface equipment 105 and a computing subsystem 118 at the surface 108. The surface equipment 105 shown in FIG. 1A operates at or above the surface 108, for example, near the well head 102, to control the wellbore isolation devices (e.g., 110*a*, 110*b*, 110*c*) and possibly other downhole equipment or other components of the well monitoring and measurement system 100. The computing subsystem 118 receives and analyzes logging data from the wellbore isolation devices (e.g., 110*a*, 110*b*, 110*c*). The well monitoring and measurement system 100*a* can include additional or different features, and the features of an logging system can be arranged and operated as represented in FIG. 1A or in another manner.

In some implementations, the well monitoring and measurement system 100*a* employs a coiled tubing system. Coiled tubing systems are well known in the oil and gas industry. The term normally connotes a relatively small diameter continuous tubing string that can be transported to a well site on a drum or in a reel. Some methods for inserting coiled tubing systems into existing wells are well known in the art. As oil and gas exploration technology continues to improve the demand for better wellbore information grows and there has been more interest in using coiled tubing to deploy more instrumentation into the wellbore, particularly pressure and temperature sensors.

A typical fiber telemetry system inside coiled tubing can consist of three fiber optic pressure transducers, one at the heel, one at the toe and one in the middle of the horizontal portion, along with additional fiber for DTS (Distributed Temperature Sensing) and/or DAS (Distributed Acoustic Sensing) telemetry. Each sensor may have single or multiple fibers. Although the number of fibers can vary, the examples given in this disclosure will demonstrate the deployment of optical fibers for DTS and/or DAS telemetry to cover wireline, tubing, casing, and coiled tubing (including intelligent, hybrid systems).

The sensors, having e.g., optical fiber, can be pulled and/or pumped into the coiled tubing. The sensing string can also include various electrical sensors, including point thermocouples for temperature sensing as well as DTS system calibration. The DTS and/or DAS fibers can be deployed on a wireline for retrievability, or pumped into a conduit after installation. The fiber for the DTS can be pumped into a double-ended conduit for some coiled tubing deployments. The location of the sensors can be carefully measured before they are pulled into the coiled tubing. The exact location can then be identified using e.g. x-ray systems and/or ultrasonic systems and/or DAS systems by tapping on the coiled tubing and/or by DTS systems and apply a thermal event or other similar methods where distance can be verified and compared with distances measured before the sensing string is pulled into the coiled tubing. Penetrations can then be drilled though the coiled tubing at suitable locations, and suitable seals can be applied to/activated on the assembly. All of the installation of the sensor systems into the tubing is done in the coiled tubing before the tubing is deployed downhole.

Figure 1B:
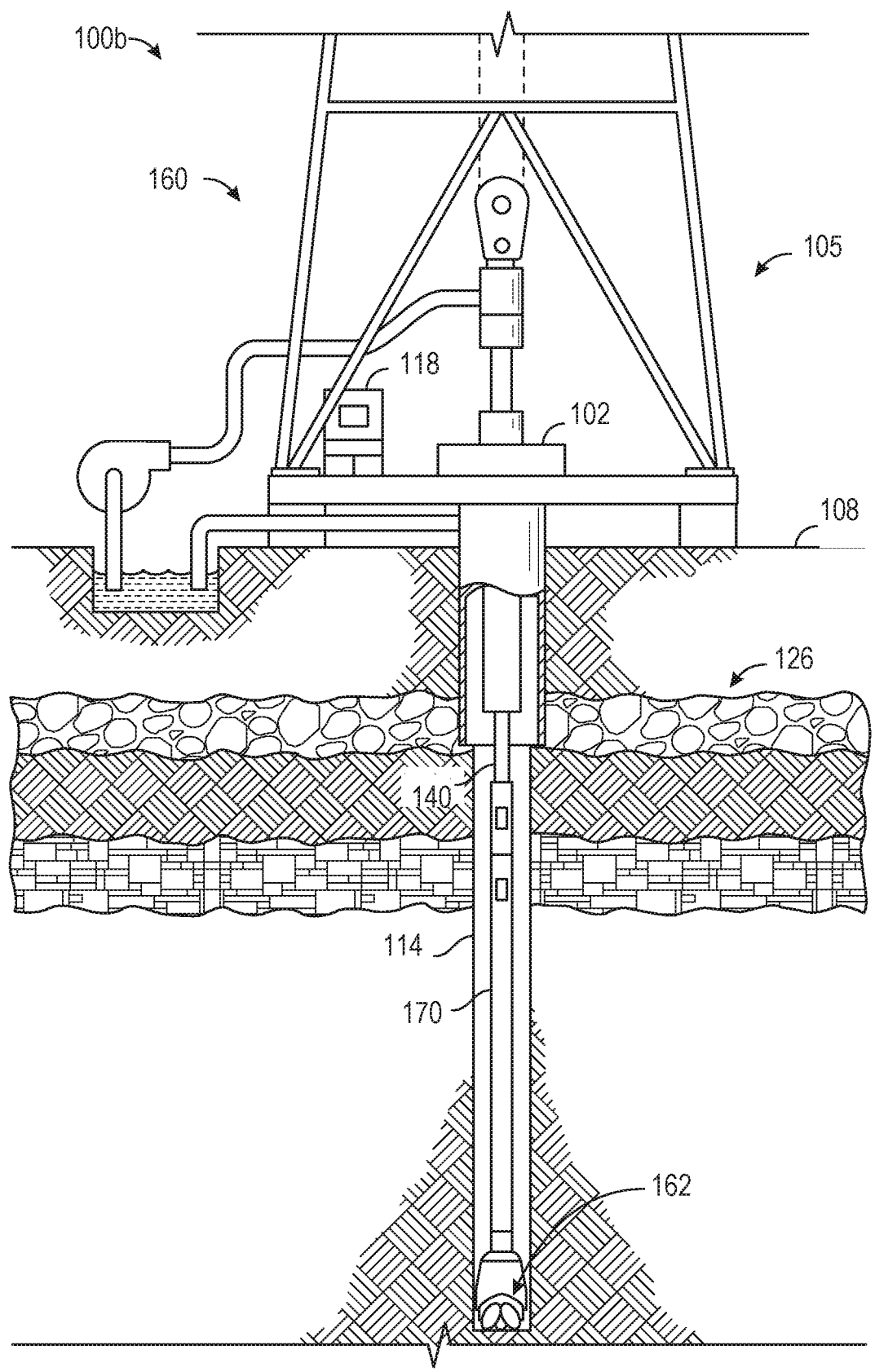
FIG. 1B illustrates an exemplary drilling assembly for implementing the processes described herein in accordance with one or more implementations.

FIG. 1B illustrates a well system 100*b* having a drilling assembly 160 for implementing the logging analysis methods described herein in accordance with one or more implementations. It should be noted that while FIG. 1B generally depicts a land-based drilling assembly, those skilled in the art will readily recognize that the principles described herein are equally applicable to subsea drilling operations that employ floating or sea-based platforms and rigs, without departing from the scope of the disclosure.

Drilling is performed using a string of drill pipes connected together to form a drill string 140 that is lowered through a rotary table into the wellbore 114 via the well head 102. The drilling assembly 160 at the surface 108 supports the drill string 140, as the drill string 140 is operated to drill a wellbore penetrating the subterranean region 126. A drill bit 162 is attached to the distal end of the drill string 140 and is driven either by a downhole motor and/or via rotation of the drill string 140 from the well surface. The drill string 140 can include, for example, but is not limited to, a kelly, a drill pipe, a bottom hole assembly, and other components. The bottomhole assembly on the drill string can include drill collars, drill bits, a logging tool 170, and other components. Exemplary logging tools can be or include, but are not limited to, measuring while drilling (MWD) tools and LWD tools.

The logging tool 170 includes an tool for obtaining measurements from the subterranean region 126. As shown, for example, in FIG. 1B, the logging tool 170 is suspended in the wellbore 114 by a coiled tubing, wireline cable, or another structure or conveyance that connects the tool to a surface control unit or other components of the surface equipment 105.

The logging tool 170 is lowered to the bottom of a region of interest and subsequently pulled upward (e.g., at a substantially constant speed) through the region of interest. As shown, for example, in FIG. 1B, the logging tool 170 is deployed in the wellbore 114 on jointed drill pipe, hard wired drill pipe, or other deployment hardware. In other example implementations, the logging tool 170 collects data during drilling operations as it moves downward through the region of interest. The logging tool 170 may also collect data while the drill string 140 is moving, for example, while the logging tool 170 is being tripped in or tripped out of the wellbore 114.

The logging tool 170 may also collect data at discrete logging points in the wellbore 114. For example, the logging tool 170 moves upward or downward incrementally to each logging point at a series of depths in the wellbore 114. At each logging point, instruments in the logging tool 170 perform measurements on the subterranean region 126. The logging tool 170 also obtains measurements while the logging tool 170 is moving (e.g., being raised or lowered). The measurement data is communicated to the computing subsystem 118 for storage, processing, and analysis. Such data may be gathered and analyzed during drilling operations (e.g., LWD operations), during wireline logging operations, other conveyance operations, or during other types of activities.

The computing subsystem 118 receives and analyzes the measurement data from the logging tool 170 to detect properties of various subsurface layers in the subterranean region 126. For example, the computing subsystem 118 can identify the density, material content, and/or other properties of the subterranean region 126 based on the measurements acquired by the logging tool 170 in the wellbore 114.

Figure 1C:
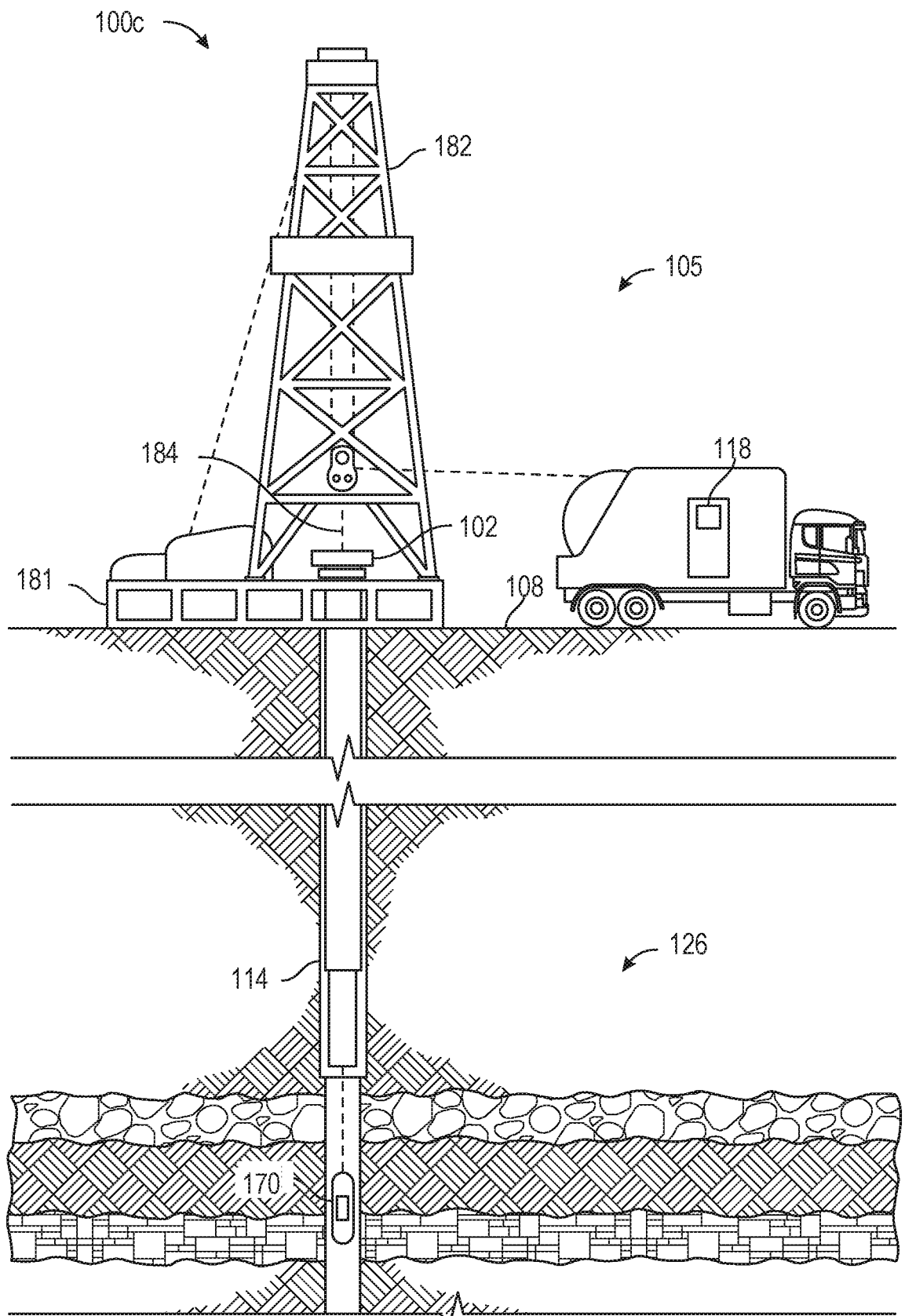
FIG. 1C illustrates a wireline system suitable for implementing the processes described herein in accordance with one or more implementations.

FIG. 1C illustrates a logging assembly 100c having a wireline system suitable for implementing the logging analysis methods described herein in accordance with one or more implementations. The well system 100b includes the logging tool 170 in a wireline logging environment. The surface equipment 105 includes, but is not limited to, a platform 181 disposed above the surface 108 equipped with a derrick 182 that supports a wireline cable 184 extending into the wellbore 114. Wireline logging operations are performed, for example, after a drill string is removed from the wellbore 114, to allow the wireline logging tool 170 to be lowered by wireline or logging cable into the wellbore 114. Typically, the logging tool 170 is lowered to a region of interest and subsequently pulled upward at a substantially constant speed. During the upward trip, instruments included in the logging tool 170 may be used to perform measurements on the subterranean formation 126 adjacent the wellbore 114 as the logging tool 170 passes by.

In FIG. 1C, the logging tool 170 may include one or more wireline instrument(s) that may be suspended into the wellbore 114 by the wireline cable 184. The wireline instrument(s) may include distributed sensors, which may be communicably coupled to the wireline cable 184 (also see FIG. 2A). The wireline cable 184 may include conductors for transporting power to the wireline instrument and also facilitate communication between the surface and the wireline instrument. Referring back to FIG. 1B, the drilling assembly 160 may include distributed sensors, which may be communicably coupled to the drill string 140.

In some implementations, the distributed sensors may comprise distributed acoustic sensors, which may also use optical fibers and permit a distributed measurement of local acoustics at any given point along the fiber. Additionally or alternatively, in an example (not explicitly illustrated), the distributed acoustic sensors may be permanently attached to or embedded within the one or more strings of casing lining the wellbore 114 (see FIG. 2C), to the one or more strings of tubing positioned downhole within the casing (see FIG. 2B), and/or the wall of the wellbore 114 at an axially spaced pre-determined distance. The optical fiber may include single-mode fiber, multi-mode fiber, or a combination thereof. The distributed acoustic sensors may be configured to operate as DAS subsystem and/or a DTS subsystem.

Figure 2C:
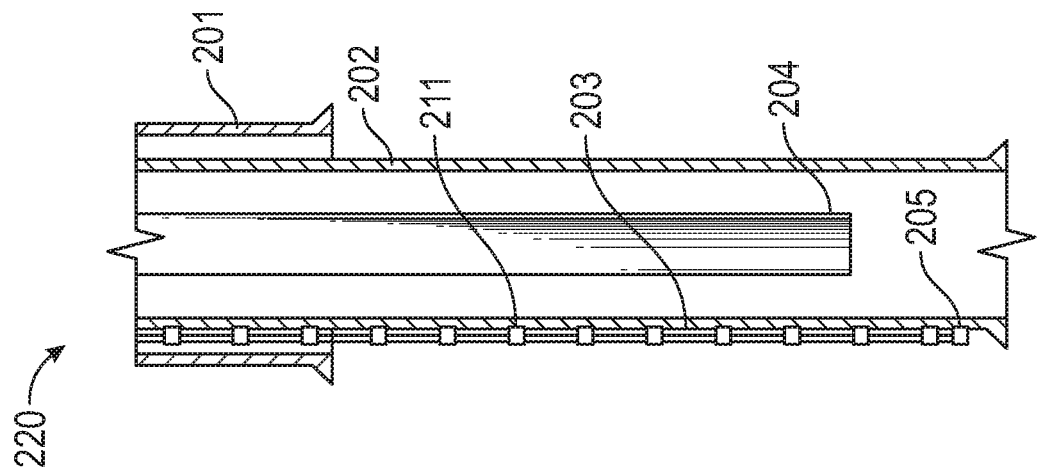
FIGS. 2A-2C illustrate examples of distributed sensing deployment options that can employ the principles of the present disclosure in accordance with one or more implementations.
Figure 2B:
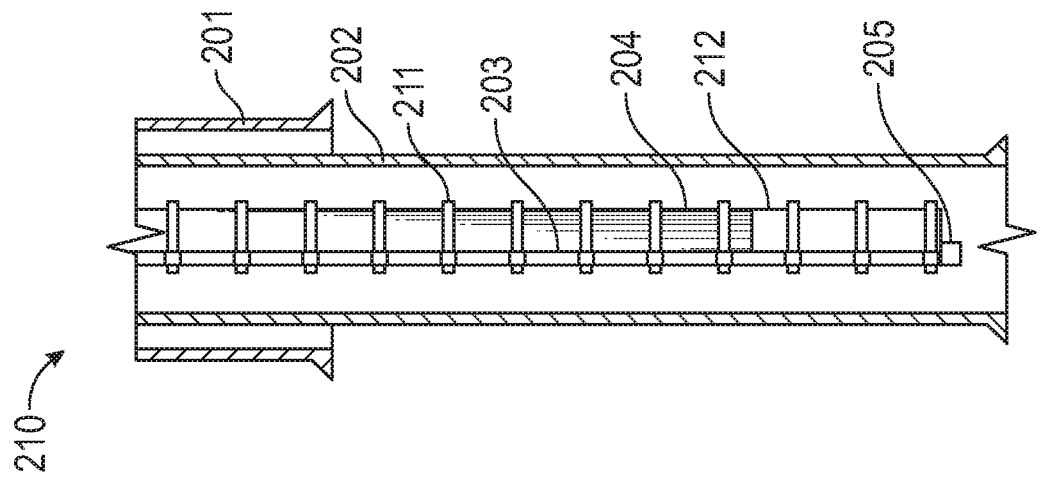
Figure 2A:
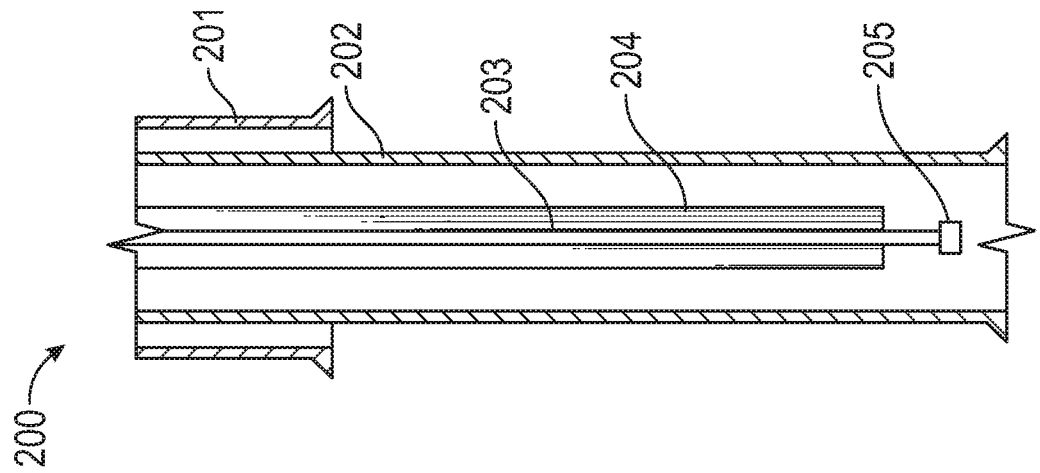

FIGS. 2A-2C illustrate examples of distributed sensing deployment options that can employ the principles of the present disclosure in accordance with one or more implementations. Wellbores for use in oil and gas exploration and production are often drilled in stages where a first stage is drilled and lined with a casing (e.g., surface casing 201), then a second, smaller diameter stage is drilled and lined with a casing (e.g., production casing 202), and so on. In some implementations, the wellbore 114 may be completed by cementing a casing string within the wellbore 114 along all or a portion thereof. Once drilling of the wellbore (e.g., 114) is finished, the wellbore completion operations are then undertaken. Completion operations generally refer to the events necessary to bring a wellbore into production once drilling operations have concluded. For example, completion operations may be performed with a completion string having tools coupled thereto (e.g., packers, side pocket mandrels, perforation guns, and the like) that provide for enablement of safe and efficient production from an oil or gas well.

In FIG. 2A, a wireline assembly 200 includes a tubing 204 deployed into a wellbore (e.g., 114) and routed through the production casing 202. A wireline cable (e.g., cable 203) housing optical fibers may be routed through the tubing 204, and later retrievable from the wellbore 114. In some aspects, the optical fibers are coupled to a wireline cable (e.g., cable 203). The optical fibers can be coupled to the wireline such that the optical fibers are removable with the wireline. The cable 203 can include multiple optical fibers. For example, the optical fibers can include one or more single-mode optical fibers and one or more multi-mode optical fibers. Each of the optical fibers may include one or more optical sensors along the optical fibers. The optical sensors may be deployed in the wellbore 114 and used to sense and transmit measurements of downhole conditions in the wellbore 114 to the earth's surface (e.g., 108). A bottom hole gauge carrier 205 is coupled to a distal end of the cable 203 for taking measurements at the toe end of the lateral wellbore. In some aspects, the bottom hole gauge carrier 205 includes a pressure/temperature gauge for measuring pressure and/or temperature.

In some implementations. Single-Mode Fiber (SMF) may be used for both DAS/DTS, or Multi-Mode Fiber (MMF) may be used for both DAS/DTS depending on implementation. In some implementations, double-clad-dual-core fiber may be employed while using e.g., SMF for DAS on the inner core and MMF DTS on the outer core without departing from the scope of the present disclosure.

In FIG. 2B, a tubing assembly 210 includes the tubing 204 deployed into the wellbore (e.g., 114) and routed through the production casing 202. The cable 203 may be routed through the tubing 204 and permanently installed along an outer surface of the tubing 204. The optical fibers housed in the cable 203 may be retained against the outer surface of the tubing 204 at intervals (e.g., every other joint) by coupling bands (e.g., cross-coupling protectors 211) that extend around the tubing 204. In some aspects, a tubing tail 212 can be extended below a bottom perforation.

In FIG. 2C, a casing assembly 220 includes a tubing 204 deployed into the wellbore (e.g., 114) and routed through the production casing 202. The cable 203 may be routed through the surface casing 201 and permanently installed along an outer surface of the production casing 202. The optical fibers housed in the cable 203 may be retained against the outer surface of the production casing 202 at intervals (e.g., every other joint) by coupling bands (e.g., cross-coupling protectors 211) that extend around the production casing 202.

The cable 203 may be configured for optical fiber sensing to obtain point or distributed optical fiber measurements. As used herein, "distributed optical fiber sensing" refers to the ability to obtain well parameter measurements along the entire length of an optical fiber, but also refers to the ability to obtain point measurements from point reflectors (e.g., Fiber Bragg Gratings, etc.) included at predetermined locations along the optical fiber(s). The optical fibers in the cable 203 may be used as distributed acoustic sensors and/or distributed temperature sensors. In an example, one or more optical fibers may be used for one or more of DAS or DTS.

A number of distributed optical fiber sensing methodologies may be used to determine the well parameters of interest, without departing from the scope of the present disclosure. When electromagnetic radiation is transmitted through an optical fiber, a portion of the electromagnetic radiation will be backscattered in the optical fiber by impurities of the optical fiber, areas of different refractive index in the fiber generated in the process of fabricating the fiber, interactions with the surfaces of the optical fiber, and/or connections between the fiber and other optical fibers or components. Some of the backscattered electromagnetic radiation is treated as unwanted noise and steps may be taken to reduce such backscattering.

Figure 3A:
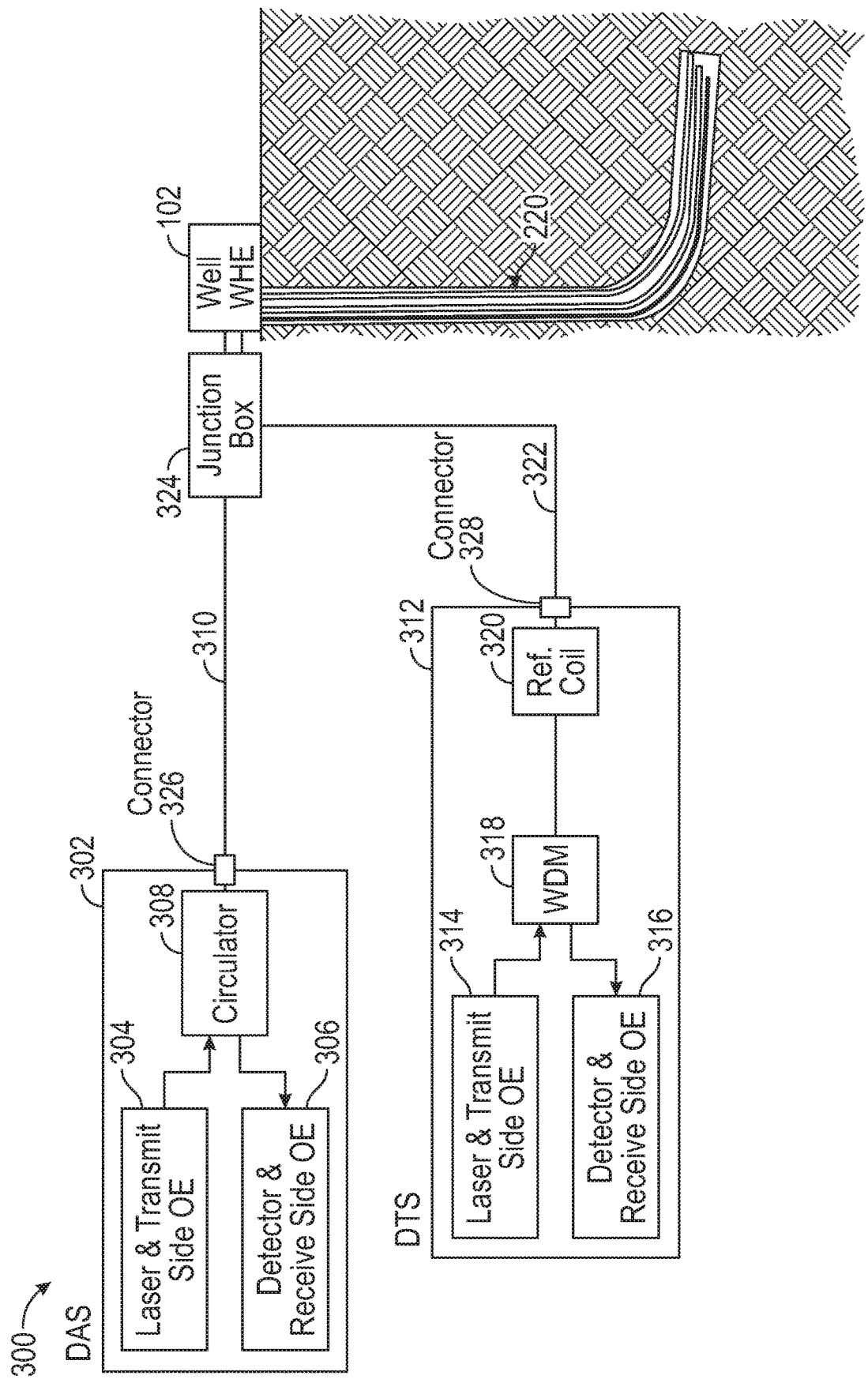
FIG. 3A illustrates an example of a distributed acoustic sensing system and a distributed temperature sensing system in accordance with one or more implementations.

FIG. 3A is a schematic diagram of an example of a distributed sensing system 300 according to one aspect of the present disclosure in accordance with one or more implementations. The distributed sensing system 300 includes a distributed acoustic sensing subsystem 302 and a distributed temperature sensing subsystem 312. The distributed acoustic sensing subsystem 302 includes a laser and transmit side module 304 and a detector and receive side module 306. Similarly, the distributed temperature sensing subsystem 312 includes a laser and transmit side module 314 and a detector and receive side module 316. In some aspects, the laser and transmit side module (e.g., 304, 314) and the detector and receive side module (e.g., 306, 316) of FIG. 3A represent respective configurations of the well monitoring and measurement system 100 of FIG. 1A, but other configurations are possible. For example, the components of the distributed sensing system 300 may be arranged in a different order or configuration without departing from the scope of the present disclosure. Similarly, one or more components may be added to or subtracted from the configuration of the distributed sensing system 300 shown in FIG. 3A without departing from the scope of the present disclosure.

Each of the distributed acoustic sensing subsystem 302 and the distributed temperature sensing subsystem 312 may be positioned, for example, at a surface of a wellbore, and each of the distributed acoustic sensing subsystem 302 and the distributed temperature sensing subsystem 312 may include an optical source (e.g., the laser and transmit side module 304, 314). The optical source may include a laser and a pulse generator. The laser can emit optical signals that can be manipulated by the pulse generator. In some aspects, the pulse generator may include one or more amplifiers, oscillators, or other suitable components to manipulate the optical signals emitted by the laser to generate pulses of optical signals at a controlled time duration.

The distributed acoustic sensing subsystem 302 includes a circulator 308. Laser pulses launched from the laser and transmit side module 304 may be fed to a bi-directional port of the circulator 308. The circulator may guide the light to a fiber connector, which is then fed over a distributed acoustic sensing optical fiber 310 positioned downhole in a wellbore (e.g., 114). The backscatter from the distributed acoustic sensing optical fiber 310 is fed back to the circulator 308, which guides the light through the circulator 308 back towards the detector and receive side module 306. The circulator 308 may be a single-mode circulator in some implementations, or may be a multi-mode circulator in other implementations.

The distributed temperature sensing subsystem 312 includes a wavelength division multiplexer 318. Laser pulses launched from the laser and transmit side module 314 are fed to the wavelength division multiplexer 318. The wavelength division multiplexer 318 may combine the light over a wavelength band and guide the light to a fiber connector, which is then fed over a distributed temperature sensing optical fiber 322 positioned downhole in the wellbore 114. In some aspects, the light being combined is at different wavelengths within the wavelength band. The backscatter from the distributed temperature sensing optical fiber 322 is fed back to the wavelength division multiplexer 318, which divides the light over one or more wavelengths back towards the detector and receive side module 316.

The distributed sensing system 300 includes a junction box 324 coupled to the distributed acoustic sensing optical fiber 310 and the distributed temperature sensing optical fiber 322. The junction box 324 may be configured to route the optical signals carried on the distributed acoustic sensing optical fiber 310 and the distributed temperature sensing optical fiber 322 to the wellbore 114 through a wellhead (WHE) 102, and vice versa. As shown in FIG. 3A, the junction box 324 couples both the distributed acoustic sensing optical fiber 310 and the distributed temperature sensing optical fiber 322, individually, to the well head 102. In the wellbore 114, the distributed acoustic sensing optical fiber 310 and the distributed temperature sensing optical fiber 322 are deployed downhole via a cable (e.g., 203) as described in FIGS. 2A-2C. The junction box 324 may include connections for transporting optical power to the distributed acoustic sensing optical fiber 310 and the distributed temperature sensing optical fiber 322 positioned downhole in the wellbore 114 and also facilitate communication between the surface and the distributed acoustic sensing optical fiber 310 and the distributed temperature sensing optical fiber 322.

DAS systems used in oil & gas applications are often based on coherent Rayleigh scattering phase based DAS system, where an optical fiber is optically coupled with (i.e. in optical communication with) a narrow-band electromagnetic radiation source (e.g., the laser and transmit side module), such as a narrow-band laser or the like. This sensing principle is based on interferometric sensing, where e.g. two optical laser pulses travel down the distributed acoustic sensing optical fiber 310 and backscattered coherent Rayleigh light interfere and create an interference signal that can be de-modulated using receiving opto-electronics in the DAS interrogator. The laser may be used to produce short pulses of light that are launched into the optical fiber and a fraction of the backward scattered light that falls within the angular acceptance cone of the optical fiber in the return direction, i.e., towards the laser source, may be guided back to the launching end of the fiber as a backscattered signal. The backscattered signal may be used to provide information regarding the time varying state of strain along the distributed acoustic sensing optical fiber 310, which may be equated to locations where fluctuations in acoustic (vibration) and/or thermal fluctuations are occurring. In the distributed acoustic sensing subsystem 302, the detector (e.g., 306), such as an optoelectronic device, may be in optical communication with the optical fiber and used to convert the backscattered electromagnetic signals to electrical signals, and a signal processor of the distributed acoustic sensing subsystem 302 may process the electrical signals to determine the magnitude of the strain assumed by the optical fiber downstream of the detector.

The phase difference between these optical laser pulses is proportional to the optical path length between the pulses, and the optical path length is sensitive to vibrations, acoustic energy and thermal expansion. Strain caused by thermal fluctuations tends to be in a low-frequency range lower than, e.g. 10 Hz, or even 1 Hz and lower. Strain caused by acoustic signals indicative of fluid flow, speed of sound and other dynamic events often vary from the low frequency range of a few Hz to several kHz or even 10's of kHz. The intent is to accurately measure the change in optical path length along the length of the sensing fiber that may be located down-hole. A number of measurements are done over time, and the difference between subsequent measurements along the fiber is recorded. This time series data can be converted to a frequency domain over a given time frame using for example Fast Fourier Transform (FFT). Evaluation of the low-frequency response may then yield information about very small thermal responses along the optical sensing fiber, and the higher-frequency content may then be used to detect various dynamic events or to track various acoustic signals along the well bore. This information can be used to constrain models and/or derive information that can be used to determine various properties including but not limited to acoustic velocities, fluid inflow points, changes in flow regimes along the well bore. There is, however, a serious challenge to accurately determine the low-frequency response given the physical properties of components. These interferometric systems are sensitive to thermal fluctuations of the components, e.g. optical fiber in the signal paths for the optical pulses inside the DAS interrogator may experience thermal expansion, differential delays and thereby provide low frequency baseline drift. It therefore may be challenging to use interferometric systems for measurements close to DC or any other low frequencies given that it is nearly impossible to differentiate between system related low frequency drift and actual thermally induced signals along the optical fibers. Interferometric systems like a phase-based DAS excel in dynamic measurements on a short timescale, where thermally induced baseline drift is small compared to the measured signal within the timeframe of the measurement. Attempts to use e.g., external or internal thermally stabilized enclosures have been tried in order to address this shortcoming of the system, and it can be used to remove large thermal drifts while at the same time introducing thermal fluctuations due to the controls of the thermal stabilization of the enclosure. Adding reference coils and reference measurements may reduce the some of these effects but the challenge largely remains. These methods, however, may not be sufficient to differentiate between large thermal instrument drifts, acoustic events downhole, strain events downhole and small thermal events downhole. The DAS systems may be based on time domain reflectometry or frequency domain reflectometry, and the systems may be based on phase based or intensity based interrogation techniques, and the systems may be based on homodyne or heterodyne interrogation techniques known to a person skilled in the art.

Other attempts to solve the thermal instability of interferometric DAS systems include high thermal stability ovens, external and internal reference coils, which locally can provide a reference, and attempts have been made to compensate the thermal drift of the instrument. These methods, however, may not be sufficient to differentiate between large thermal instrument drift, acoustic events downhole, strain events downhole and small thermal events downhole.

DTS systems used in the oil & gas industry are commonly based on Raman scattering to detect changes in temperature along the distributed temperature sensing optical fiber 322, where a pulse is transmitted down a sensing fiber and backscattered Raman Stokes and anti-Stokes amplitudes are measured and converted to temperature profiles. Raman-based DTS systems are intensity based, and small changes in fiber and component temperature does not materially impact the temperature measurement accuracy. More specifically, fluctuations or changes in temperature can affect the glass fibers of the distributed temperature sensing optical fiber 322 and locally change the characteristics of light propagation in the distributed temperature sensing optical fiber 322. Because of a temperature-dependent nonlinear process called Raman scattering, the location and magnitude of a temperature change can be determined so that the distributed temperature sensing optical fiber 322 can be used as a linear thermometer.

The signal-to-noise ratio (SNR) for a given measurement is relatively low, so it is common to average the data over a long period of time (high number of repeat measurements) to increase the SNR as the signal is coherent. Additionally, many noise sources are random in nature, and these noise sources will then cancel out while the signal accumulates as measurements are averaged. Raman-based DTS systems are built to provide a stable accurate signal, but these systems, in many cases, do not provide fast temperature measurements with high resolution. DTS systems commonly include a reference coil 320 located in a stable environment, and the temperature of the reference coil 320 is accurately measured using high resolution high accuracy temperature sensors. This information is also used to calibrate backscattered Raman light from the reference coil 320, i.e. a factory calibration. This factory calibration can be used to correlate and calibrate backscattered light along the distributed temperature sensing optical fiber 322 with a known temperature measurement along the sensing fiber, i.e. a field calibration. A field calibration may be needed to compensate for differences in fiber backscatter coefficients, optical splice losses, connectors, etc., that may impact the amplitudes including amplitude changes versus wavelength of the transmitted pulse amplitude as well as the backscattered Raman Stokes and anti-Stokes amplitudes, given that these reside at different wavelengths.

One approach in attempting to solve the thermal drift issue includes using the DTS systems as a reference to then back out thermal events. Challenges with this approach include spatial alignment between the DTS fiber and the DAS fiber as the cable housing the DTS and DAS fibers may have non-uniform overstuff including different lead-in fiber lengths (i.e. 310 and 322) between the systems, which may make it challenging to obtain a common reference point. Thermal and/or vibrational events may change the optical path length of fiber 310 impacting the DAS measurement system 302 differently than thermal and/or vibrational events may impact fiber 322 and DTS system 312 along the travel path through the junction box 324 and the well head 102. It is common to use single mode fibers for DAS and multi-mode fibers for DTS, where the fibers have different refractive indexes and the refractive index in each fiber may vary versus depth. It is well known that the refractive index of various optical fibers have a thermal dependency, and this will further introduce inaccuracies. This may impact pulse travel velocity, which may then impact the depth accuracy between the systems, which is critical for accurate depth calibration, thermal drift compensation and flow modeling.

Other attempts to overcome the thermal drift issue of DAS systems include monitoring a well-defined cable, and introduce known thermal events and measure the DAS response. The optical sensing fiber is free to move inside the cable, and the temperature to strain conversion between the outer cable element(s) and the sensing fiber may be known and calibrated so that the associated changes in optical path length is known. Friction and vibration however may distort the response of the system and introduce errors. The combined system as described in FIG. 3A is a challenge to use when the objective is to accurately measure and differentiate between actual small thermal events versus DAS interrogator measurements inaccuracies caused by thermal and/or vibrational environmental effects.

The subject technology overcomes the drawbacks of using an independent DTS system to compensate for the thermal drift of an independent DAS system. The subject technology provides for the use of the DTS data in the shared reference coil as well as the use of DTS data at any point along the shared fiber to derive and differentiate between instrument drift on the surface, acoustic events downhole, strain events downhole and small thermal events downhole. This enhancement in measurement technology enable higher fidelity measurements that can be used for real-time permanently installed flow monitoring systems based on DTS/DAS technology.

In some aspects, the subject technology provides for a system using DAS/DTS measurements to determine characteristics of events during multiphase production of horizontal wells. The present disclosure provides for wavelength division multiplexing a DAS system with a DTS system so that they share a common reference coil and use a common sensing fiber. For example, the subject technology may use cables where the optical fiber may be housed in a cable with good strain coupling between the outer sheath of the cable and the optical sensing fiber to ensure an accurate response in the optical fiber based on the thermal expansion/contraction of the outer cable element. This provides a faster and more accurate response between a thermal event and the measured change in optical path length using a low frequency component of a measured DAS signal. The systems may be based on single or multi-mode fibers and components.

The subject technology uses generated high resolution temperature signals and acoustic signals along the wellbore to model wellbore properties, fluid properties, or other events that can be used to derive single, dual phase and multiphase flow. The subject technology enables measurements of absolute temperature, high resolution temperature and acoustic signatures that can be used do derive flow properties while simultaneously measuring speed of sound using a DAS system. Characteristics of flow condition change monitored by DAS are used to constrain the production monitoring model.

Figure 3B:
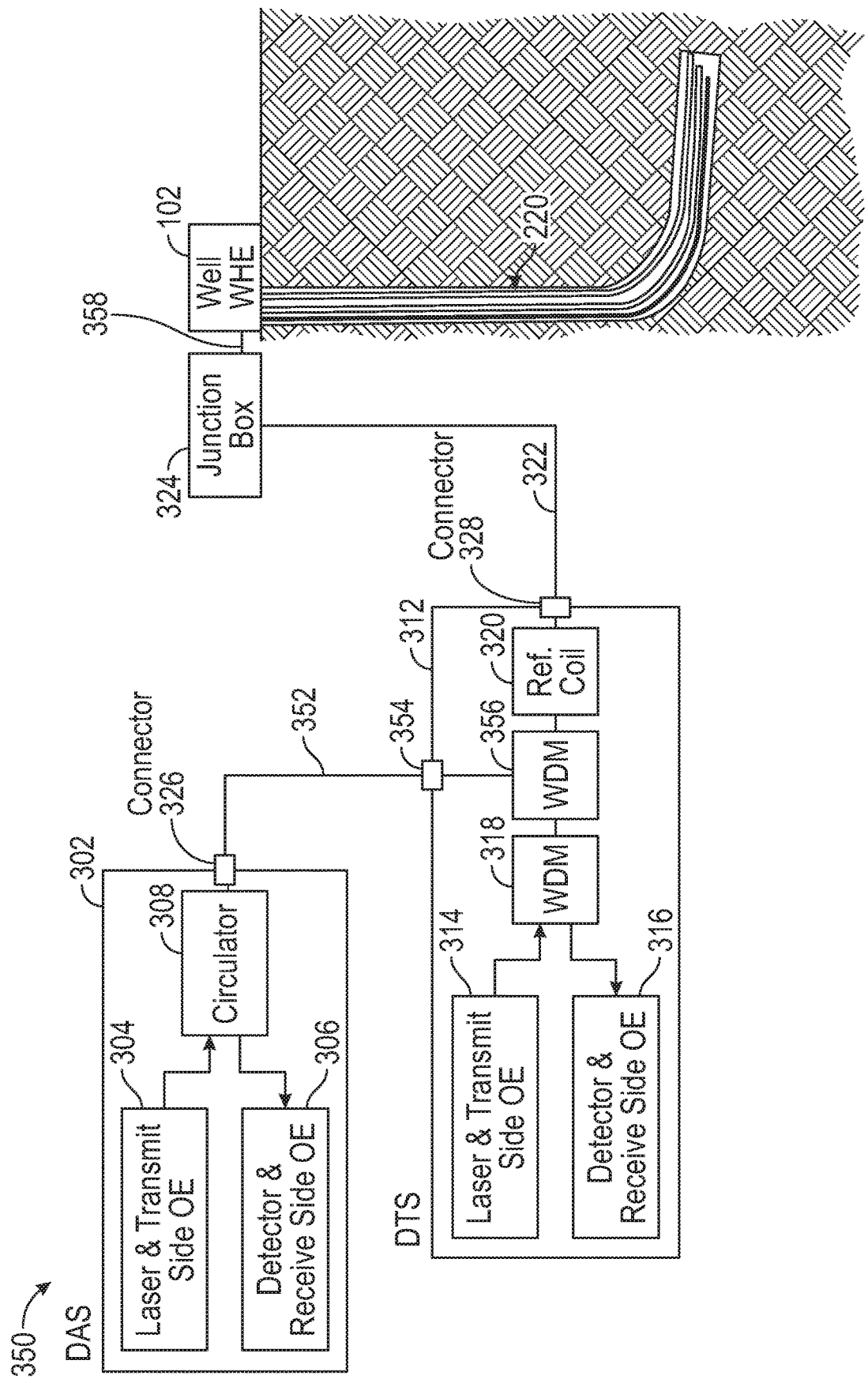
FIG. 3B illustrates an example of a distributed acoustic sensing system multiplexed through a distributed temperature sensing system in accordance with one or more implementations.

An example of wavelength division multiplexing a DAS system through a DTS system is presented in FIG. 3B in accordance with one or more implementations. A distributed sensing system 350 includes the distributed acoustic sensing subsystem 302 positionable, for example, on a surface and that includes, for example, a single-mode optical fiber as a communication medium for a distributed acoustic sensing signal. The distributed sensing system 350 also includes a distributed temperature sensing subsystem 312 positionable, for example, on the surface and that includes, for example, a single-mode optical fiber as a communication medium for a distributed temperature sensing signal. The distributed sensing system 350 includes a cable 322 positioned in a wellbore (e.g., 114) penetrating through one or more subterranean formations, in which the distributed acoustic sensing subsystem 302 is communicatively coupled to a common sensing cable (e.g., 322) through the distributed temperature sensing subsystem 312. In some aspects, the cable 322 includes one or more optical fibers used to obtain optical fiber measurements.

The distributed sensing system 350 includes the junction box 324 coupled to the cable 322. The junction box 324 may be configured to route the distributed acoustic sensing optical signals and distributed temperature sensing optical signals carried on the cable 322 to the wellbore 114 through the wellhead 102, and vice versa. As shown in FIG. 3B, the junction box 324 couples the cable 322 to the well head 102. In contrast, the distributed acoustic sensing optical fibers and distributed temperature sensing optical fibers were coupled from the junction box 324 to the well head 102 over separate cables. In the wellbore 114, the cable 203 is deployed downhole as described in FIGS. 2A-2C.

The distributed sensing system 350 also includes a data acquisition system including a processor and a non-transitory computer readable medium, in which the distributed acoustic sensing subsystem 302 and the distributed temperature sensing subsystem 312 are communicatively coupled to the data acquisition system. In some aspects, the computer readable medium stores instructions that, when executed by the processor, cause the processor to obtain a downhole measurement from the optical fiber measurements. The instructions also cause the processor to determine a trigger event based on a change between the downhole measurement and a reference measurement. The instructions also cause the processor to initiate a predetermined workflow based on the determined trigger event. The instructions also cause the processor to determine flow information in a wellbore penetrating one or more subterranean formations based on the predetermined workflow.

In one or more implementations, the distributed temperature sensing subsystem 312 includes a wavelength division multiplexer (e.g., 356).

In one or more implementations, the distributed acoustic sensing subsystem 302 includes a single-mode circulator (e.g., 308) coupleable to an optical transmitter (e.g., 304) for routing a single-mode optical signal from the optical transmitter (e.g., 304) through a single-mode fiber connector 326 to the one or more optical fibers positioned downhole in the wellbore 114 and communicatively coupleable to an optical receiver (e.g., 306) for routing a reflective optical signal received from the one or more optical fibers to the optical receiver 306.

In one or more implementations, the distributed temperature sensing subsystem 312 includes a first wavelength division multiplexer 318 coupleable to an optical transmitter 314 for routing a single-mode optical signal from the optical transmitter 314 through a single-mode optical fiber to the one or more optical fibers positioned downhole in the wellbore 114 and communicatively coupleable to an optical receiver 316 for routing a reflective optical signal received from the single-mode optical fiber to the first wavelength division multiplexer 318.

In one or more implementations, the distributed temperature sensing subsystem 312 includes a second wavelength division multiplexer 356 coupleable to the first wavelength division multiplexer 318 and to a fiber connector (e.g., 326) of the distributed acoustic sensing subsystem 302 for routing the distributed temperature sensing signal from the first wavelength division multiplexer 318 and the distributed acoustic sensing signal from the single-mode circulator 308 to the one or more optical fibers positioned downhole in the wellbore 114 through a reference coil 320 and for routing the reflective optical signal received from the cable 322 to the optical receiver (e.g., 316) of the distributed temperature sensing subsystem 312 through the first wavelength division multiplexer 318 and to an optical receiver (e.g., 306) of the distributed acoustic sensing subsystem 302 through the single-mode circulator 308. As shown in FIG. 3B, the second wavelength division multiplexer 356 is coupled to a fiber connector 354 of the distributed temperature sensing subsystem 312, to the first wavelength division multiplexer 318, and to the reference coil 320. In some aspects, the wavelength division multiplexer 356 multiplexes the distributed acoustic sensing signal with the distributed temperature sensing signal into a composite distributed sensing signal for downhole transmissions. In some implementations, the second wavelength division multiplexer 356 separates one or more acoustic signals (e.g., low to high frequency high resolution components) from one or more temperature signals (e.g., low frequency high accuracy components) in the reflective optical signal for uphole transmissions. In some implementations, the reflective optical signal carries low-frequency content in a range of about 900 nanometers (nm) to 1100 nm, and low-to-high-frequency content in a range of about 1500 nm to 1600 nm.

In some implementations, the reference coil 320 is common between the distributed acoustic sensing subsystem 302 and the distributed temperature sensing subsystem 312. In some implementations, the reference coil 320 is coupled to the second wavelength division multiplexer 356 and to a fiber connector 328.

The one or more optical fibers include a sensing fiber (e.g., 322) that is common between the distributed acoustic sensing subsystem 302 and the distributed temperature sensing subsystem 312. In some implementations, the distributed acoustic sensing subsystem 302 is coupled to a first fiber connector 354 of the distributed temperature sensing subsystem 312 and the cable 322 is coupled to a second fiber connector (e.g., 328) of the distributed temperature sensing subsystem 312. In some aspects, the fiber connector 354 couples to the fiber connector 326 of the distributed acoustic sensing subsystem 302.

The distributed sensing system 350 is positioned on a surface, and a common sensing fiber (e.g., 322) coupled to the distributed sensing system 350 is deployed into the wellbore 114. The distributed sensing subsystem has the distributed acoustic sensing subsystem 302 communicatively coupled to the common sensing fiber (e.g., 322) positioned downhole in the wellbore 114 through the distributed temperature sensing subsystem 312. The distributed sensing system 350 obtains a downhole measurement from the common sensing fiber (e.g., 322). The distributed sensing system 350 determines a trigger event based on a change between the downhole measurement and a reference measurement. The distributed sensing system 350 initiates a predetermined workflow based on the determined trigger event. The distributed sensing system 350 determines flow information in the wellbore based on the predetermined workflow.

In initiating the predetermined workflow, the distributed sensing system 350 generates a production monitoring profile associated with the wellbore 114, and constrains the production monitoring profile using the downhole measurement.

In constraining the production monitoring profile, the distributed sensing system 350 measures a change in optical path length using a low frequency component of a measured distributed acoustic sensing signal, and compensates for the measured change in the optical path length due to instrument drift using temperature data from a measured distributed temperature sensing signal on the common sensing fiber and/or common reference coil.

The distributed sensing system 350 also obtains distributed acoustic sensing signals and distributed temperature sensing signals from the common sensing fiber (e.g., 322) through a common reference coil 320 at the distributed temperature sensing subsystem 312. The distributed sensing system 350 extracts acoustic data from the distributed acoustic sensing signals and temperature data from the distributed temperature sensing signals, in which the downhole measurement is obtained based on the acoustic data and the temperature data.

In determining the trigger event, the distributed sensing system 350 obtains the reference measurement from one or more surface measurements, and obtains one or more predetermined event profiles for a type of the downhole measurement. The distributed sensing system 350 then determines that the downhole measurement correlates to the one or more predetermined event profiles.

In one or more implementations, the downhole measurement is a distributed temperature measurement based on one or more of Rayleigh scattering, Brillouin scattering or Raman scattering. In determining the trigger event, the distributed sensing system 350 determines, for example, whether a change between the distributed temperature measurement and the reference measurement exceeds a predetermined threshold.

In one or more implementations, the downhole measurement is a distributed interferometric measurement based on Rayleigh backscatter. In determining the trigger event, the distributed sensing system 350 determines, for example, whether a change between the distributed interferometric measurement and the reference measurement exceeds a predetermined threshold.

In one or more implementations, the downhole measurement is a distributed vibration measurement based on Rayleigh backscatter. In determining the trigger event, the distributed sensing system 350 determines, for example, whether a change between the distributed vibration measurement and the reference measurement exceeds a predetermined threshold.

In one or more implementations, the downhole measurement is a pressure measurement using one or more pressure sensors (e.g., 205). In determining the trigger event, a pressure sensing surface interrogator (not shown) measures a down-hole pressure and determines, for example, whether a change between the pressure measurement and the reference measurement exceeds a predetermined threshold. The pressure sensing system may be connected to a computer system (e.g., 118), and the computer system may determine whether a change between the pressure measurement and the reference measurement exceeds a predetermined threshold. Pressure sensing technology and pressure sensing systems are known to a person skilled in the art, and the pressure sensing system may be electrical or optical.

In some implementations, the downhole measurement includes a measured low frequency strain or acoustic signal from the distributed acoustic sensing subsystem 302 and a measured low frequency temperature signal from the distributed temperature sensing subsystem 312. In initiating the predetermined workflow, the distributed sensing system 350 modifies the measured low frequency acoustic signal using the measured low frequency temperature signal. In some aspects, the measured low frequency acoustic signal is modified to reduce a low frequency baseline drift in the measured low frequency acoustic signal. The distributed sensing system measures a high resolution dynamic temperature measurement based on the modified measured low frequency acoustic signal and the measured low frequency temperature signal.

Figure 4A:
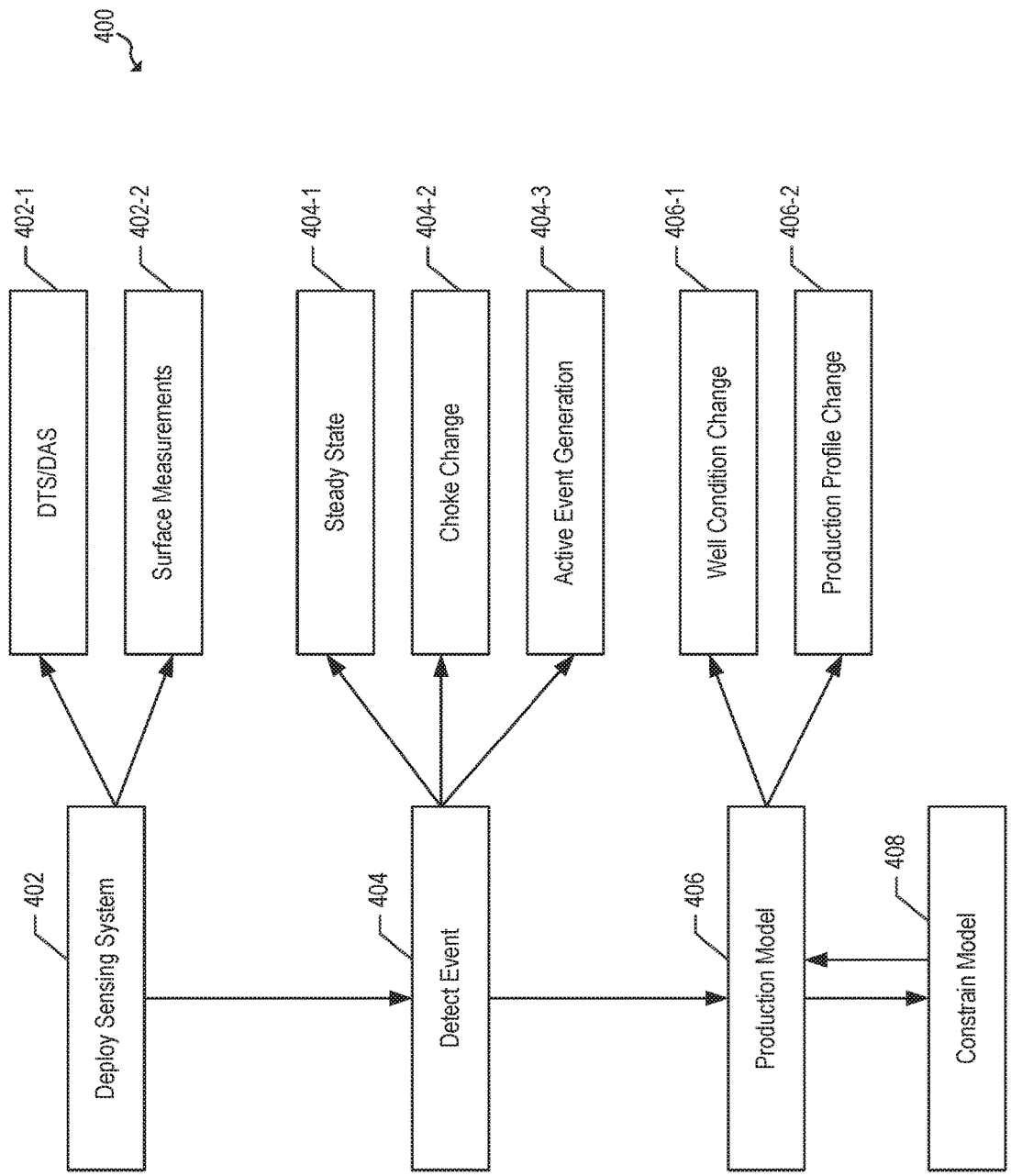
FIG. 4A illustrates an example of a process for production monitoring using the distributed acoustic sensing system is multiplexed with the distributed temperature sensing system in accordance with one or more implementations.

FIG. 4A illustrates an example of a process 400 for production monitoring using the distributed acoustic sensing system multiplexed through the distributed temperature sensing system in accordance with one or more implementations. The process 400 begins at step 402 where a production monitoring system is deployed. For example, optical sensors may be deployed in the wellbore 114 by different fiber deployment options including, but not limited to, by deploying a retrievable wireline with optical fiber housed therein, by deploying a tubing with optical fiber permanently installed on the tubing, by deploying a casing (and cemented) with optical fiber permanently installed on the casing, or by deploying coil tubing with optical fiber housed therein. In deploying the production monitoring system, distributed temperature sensing measurements and distributed acoustic sensing measurements are obtained from downhole in a wellbore (402-1). Reference measurements at the surface (i.e., surface measurements) are also obtained by the production monitoring system (402-2).

In some implementations, a reference pressure measurement at the surface and/or downhole where a change in pressure beyond a set value triggers a workflow. Specific pressure profiles may be included as conditions for the trigger given that a pressure event measured at the surface may be distorted by the time the pressure change reaches the surface pressure sensor. A pressure change indicates a change in fluid flow and/or fluid properties along the wellbore, and this in turn may generate a thermal event that can be tracked and used for bulk velocity flow measurements.

In some implementations, a reference temperature measurement at the surface and/or downhole where a change in temperature beyond a set value triggers a workflow. Specific temperature profiles may be included as conditions for the trigger given that a temperature event measured at the surface may be distorted by the time the pressure change reaches the surface pressure sensor. In one or more implementations, the temperature measurement may be a distributed measurement based on e.g. Raman, Rayleigh or Brillouin scattering. In one or more implementations, the temperature measurement may be a point measurement based on, e.g., an optical measurement using Fabry-Perot, Fiber Bragg Grating (FBG) or other measurements well known to a person skilled in the art. In one or more implementations, the temperature measurement may be a point measurement based on, e.g., an electrical measurement based on capacitive, resistive, semi-conductor based or other measurements well known to a person skilled in the art.

In some aspects, deviations between measured acoustic signals and a reference acoustic measurement at the surface and/or downhole beyond a set value triggers a workflow. Specific acoustic profiles may be included as conditions for the trigger given that an acoustic event measured at the surface may be distorted by the time the acoustic event reaches the surface pressure sensor. In one or more implementations, the acoustic measurement may be a distributed interferometric measurement based on e.g. Rayleigh backscatter, reflections from one or multiple FBG's or other sensing principles. The sensor system/interrogation scheme may include, e.g., Fabry-Perot, Michelson, Mach-Zehnder, Sagnac or other inteiferometric devices. In one or more implementations, the acoustic measurement may be a point measurement based on, e.g., an optical measurement using, e.g., Fabry-Perot, Michelson, Mach-Zehnder, Sagnac or other interferometric devices. In one or more implementations, the acoustic measurement may be a point measurement based on, e.g., an electrical measurement based on hydrophones or microphones.

In some aspects, deviations between measured vibration signals and a baseline measurement at the surface and/or downhole beyond a set value triggers a workflow. Specific vibration profiles may be included as conditions for the trigger given that a vibration event measured at the surface may be distorted by the time the vibration event reaches the surface pressure sensor. In one or more implementations, the vibration measurement may be a distributed interferometric measurement based on, e.g., Rayleigh backscatter, reflections from one or multiple FBG's or other sensing principles known to a person skilled in the art. The sensor system/interrogation scheme may include, e.g., Fabry-Perot, Michelson, Mach-Zehnder, Sagnac or other interferometric devices. In one or more implementations, the vibration measurement may be a point measurement based on, e.g., an optical measurement using, e.g., Fabry-Perot, Michelson. Mach-Zehnder, Sagnac or other interferometric devices well known to a person skilled in the art. In one or more implementations, the vibration measurement may be a point measurement based on, e.g., an electrical measurement based on accelerometers or geophones configured in a single axis or multiple axis configurations. Different axes may have different signatures for a given event, and different vibrations measured in different axes may travel at velocities through the earth and/or completion and/or fluids.

Next, at step 404, the production monitoring system detects a trigger event. A number of triggers can be used to identify events that may be suitable for flow identification and quantification using pre-determined workflows. Triggers may include different types of reference measurements at the surface and/or downhole where a change between a reference measurement and a downhole measurement of a corresponding type beyond a set value triggers a predetermined workflow. In some implementations, the trigger events are detected by steady state measurement comparisons (404-1). In one or more implementations, an event is generated such as choke changes (404-2), or by active event generation (404-3).

A predetermined workflow may include collecting data (as a function of time and/or depth) and correlating that time/depth data with trigger events as trigger events may occur at the surface some period of time after they occurred downhole. In one or more implementations, the information may need to be properly synchronized in order to gain insights into fluid flow properties. In some aspects, the trigger events may be indicative of a gas breakthrough, a water breakthrough, a surface flow rate change, and/or a sand detection/production. The predetermined workflow may include generation of trigger events, e.g. multiple flow rate changes and stack data.

In some aspects, the predetermined workflow may include measurement of data and storage of that data in a buffer, where the stored data can be used in a window of time before/after event as needed. In other aspects, only saved data may be needed for event detection. This would allow real-time and permanent deployment of sensing systems like, e.g., DAS that generate large volumes of data. When storing large amounts of data, the data storage may include various data decimation options.

Triggered active events on a surface can create a responsive signal measured by DAS (e.g., the distributed acoustic sensing subsystem 202 and the distributed temperature sensing subsystem 212), which includes temperature change, pressure change and frequency change. This information may provide characteristics of wellbore fluid that includes fluid properties, flow regime, and flow condition.

In some aspects, the active events can be generated by closing valves or changing choke size relatively quickly on the surface. The propagation and reflection characteristics of pressure pulse generated by active events will be used to detect changes of flowrate, locate production point, and fluid properties.

Subsequently, at step 406, the production monitoring system generates a production model. In some aspects, the production model is associated with a predetermined workflow.

The predetermined workflow includes measuring absolute static temperature based on the Raman-based measurement, where the data is used for DTS thermal modeling, and baseline temperature for drift correction. The predetermined workflow can include high resolution dynamic temperature measurements in order to derive bulk flow once corrected for interrogator drift. Any small temperature variation can be tracked along the wellbore, and the slope of the measurement can then provide a velocity when the event travels a certain distance for a given time. In some aspects, the predetermined workflow also includes determining bulk flow rate based on the temperature data. The predetermined workflow also includes determining whether the flow is Laminar or Turbulent. Inputs would be inner diameter of casing/tubing, density, viscosity, i.e. parameters that are known within some range based on the well. A small change in draw-down or small variations in fluid flow/velocity generate small changes in inflow from the reservoir, which generate a small thermal event that can be tracked using this high resolution dynamic temperature measurement system.

In some implementations, the predetermined workflow includes velocity tracking such as speed-of-sound measurements using DAS, where the speed of sound measurement is done by tracking acoustic waves generated by turbulent flow and/or other acoustic events. The speed-of-sound measurements can be used to identify: (1) fluid mixture, (2) well deviations, and (3) flow regime. The flow mixture is determined where (a) liquids normally have speed of sound in the range of 1200-1600 m/s; and (b) gas/liquids typically have speed of sound in the range between 200-600 m/s at gas liquid rates below 95%. The well deviations are often logged, and small changes in well deviations can alter the flow regime. It is therefore important to map well deviation against depth to determine appropriate models to use for flow regime determination, to determine the appropriate flow velocity profile versus depth, and to determine information about the hold-up profile and slip. The flow regime can be determined using certain predetermined models, e.g., Beggs & Brill's model or Taitel & Dukler's model.

In one or more implementations, the production model is generated based on a well condition change (406-1). In some aspects, the well condition change may be generated in response to a generated active event such as a choke change (e.g., 404-2). In other implementations, the production model is generated based on a production model change (406-2). At step 408, the production model is constrained. In some aspects, additional criteria may be employed to make the production model more accurate. In some implementations, additional conditions are added to the DAS aspects of the production model. In constraining the production model, the DAS data may be used to constrain the DTS data, and vice versa. Traditional approaches in distributed measurements refer to DAS or DTS data individually, which limits inferences about the multi-phase flow problem. Analyzing DTS or DAS data individually is not sufficient to fully determine multiphase flow conditions. By combining information from DAS and DTS, the constrained production model can yield more accurate multiphase flow rate for all ranges of water cuts and gas volume fraction. The DTS data helps to determine non-unique gas solutions that DAS suffers from for a range of gas fraction values.

FIG. 4B illustrates another example of a process 410 for production monitoring using the distributed acoustic sensing system multiplexed through the distributed temperature sensing system in accordance with one or more implementations. The process 410 begins at step 412 where a sensing system is deployed into a downhole environment (e.g., a wellbore 114). For example, the sensing system may be deployed in the wellbore 114 by different fiber deployment options including, but not limited to, by deploying a retrievable wireline with optical fiber housed therein, by deploying a tubing with optical fiber permanently installed on the tubing, by deploying a casing (and cemented) with optical fiber permanently installed on the casing, or by deploying coil tubing with optical fiber housed therein. At step 414, a well is opened incrementally. Next, at step 416, the production monitoring system generates a DAS/DTS production model. Subsequently, at step 418, the DAS/DTS production model is constrained.

Figure 4C:
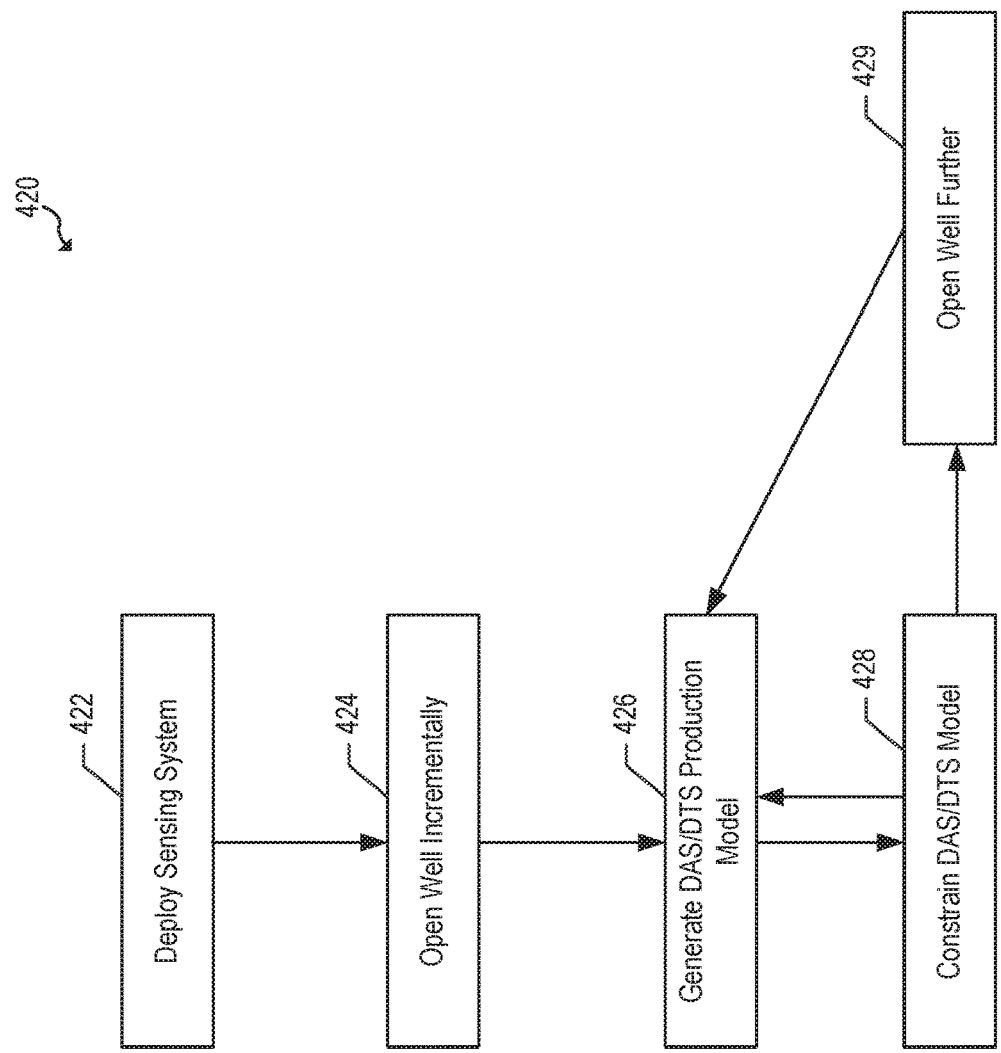
FIG. 4C illustrates another example of a process for production monitoring using the distributed acoustic sensing system multiplexed through the distributed temperature sensing system in accordance with one or more implementations.

FIG. 4C illustrates another example of a process 420 for production monitoring using the distributed acoustic sensing system multiplexed through the distributed temperature sensing system in accordance with one or more implementations. The process 420 begins at step 422 where a sensing system is deployed into a downhole environment. For example, the sensing system may be deployed in the wellbore 114 by different fiber deployment options including, but not limited to, by deploying a retrievable wireline with optical fiber housed therein, by deploying a tubing with optical fiber permanently installed on the tubing, by deploying a casing (and cemented) with optical fiber permanently installed on the casing, or by deploying coil tubing with optical fiber housed therein. At step 424, a well is opened incrementally. Next, at step 426, the production monitoring system generates a DAS/DTS production model. Subsequently, at step 428, the DAS/DTS production model is constrained. At step 429, the well is opened further. The process 420 may subsequently revert to step 426 to generate an updated version of the DAS/DTS production model based on the well having been opened further.

Figure 4D:
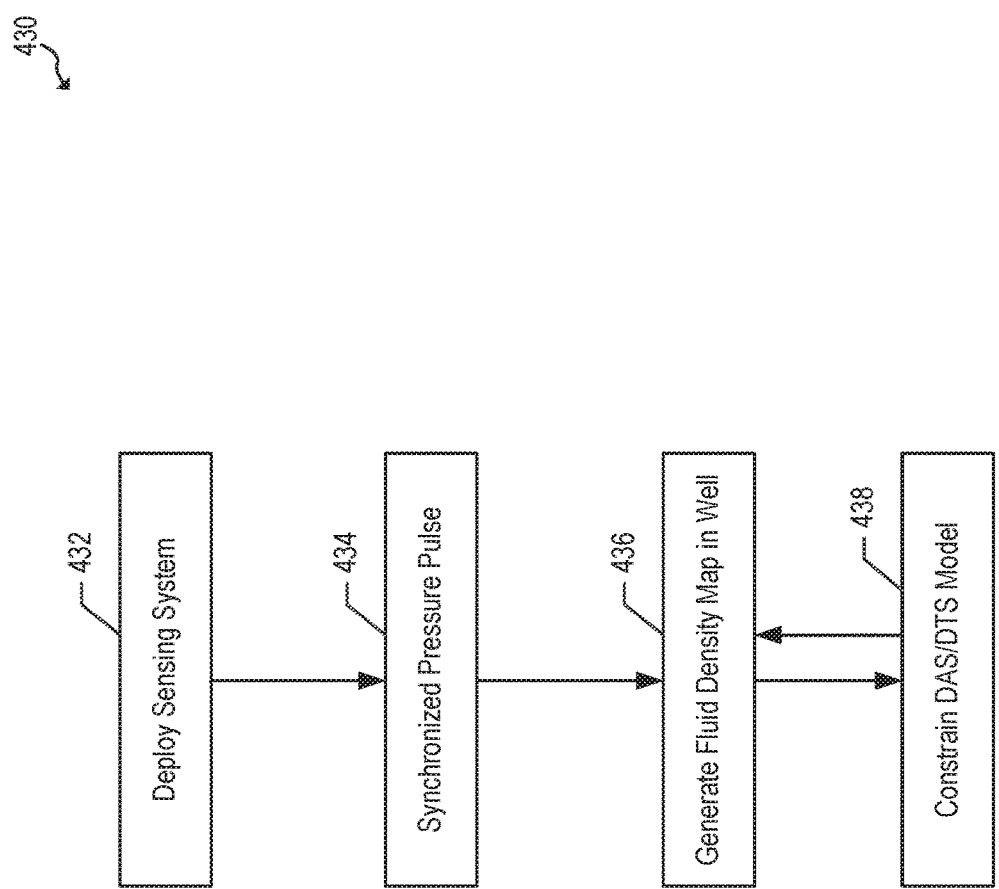
FIG. 4D illustrates another example of a process for production monitoring using the distributed acoustic sensing system multiplexed through the distributed temperature sensing system in accordance with one or more implementations.

FIG. 4D illustrates another example of a process 430 for production monitoring using the distributed acoustic sensing system multiplexed through the distributed temperature sensing system in accordance with one or more implementations. The process 430 begins at step 432 where a sensing system is deployed. For example, the sensing system may be deployed in the wellbore 114 by different fiber deployment options including, but not limited to, by deploying a retrievable wireline with optical fiber housed therein, by deploying a tubing with optical fiber permanently installed on the tubing, by deploying a casing (and cemented) with optical fiber permanently installed on the casing, or by deploying coil tubing with optical fiber housed therein. At step 434, a pressure pulse is synchronized. Next, at step 436, a fluid density map in the well is generated. Subsequently, at step 438, the DAS/DTS production model is constrained. The fluid density map may be modified (or updated) based on the constrained DAS/DTS model.

Figure 4E:
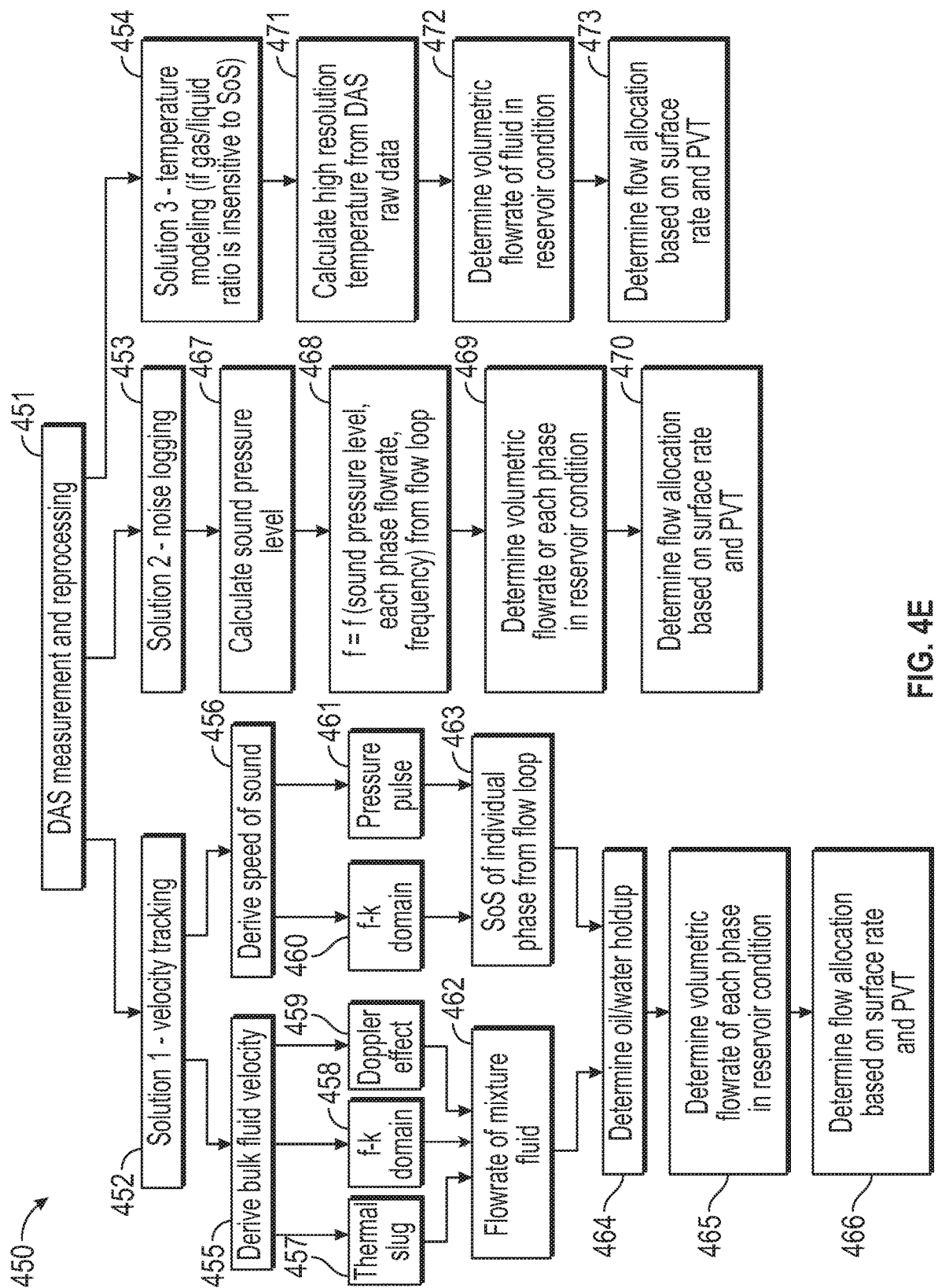
FIG. 4E illustrates another example of a process for production monitoring using the distributed acoustic sensing system multiplexed through the distributed temperature sensing system in accordance with one or more implementations.

FIG. 4E illustrates another example of a process 450 for production monitoring using the distributed acoustic sensing system multiplexed through the distributed temperature sensing system in accordance with one or more implementations. The process 450 begins at step 451 where the DAS measurement and reprocessing may serve as an action under the production model. At step 452, a physical-based model such as velocity tracking may be initiated. From the velocity tracking, either bulk fluid velocity (455) or speed of sound (456) is derived. Under the derivation of the bulk fluid velocity, a thermal slug (457), a f-k domain (458) and/or Doppler effect (459) can be resolved. These elements can be used to determine the flowrate of a mixture fluid (462). Under the derivation of speed of sound, the f-k domain (460) and/or pressure pulse (461) are resolved. These two elements can be used to determine the speed-of-sound (SoS) of individual phase from a flow loop (463). Next, at step 464, the oil/water holdup can be determined based on the flowrate of mixture fluid and/or the SoS of individual phase from flow loop. Subsequently, at step 465, the production monitoring system determines the volumetric flowrate of each phase in reservoir condition. At step 466, the production monitoring system then determines the flow allocation based on the surface rate and PVT (pressure-volume-temperature).

Active events can cause local convective fluid disturbances, which introduce dynamic pressure variations. These variations impact dynamic strain on the boundary walls and DAS can be possible to track variations as flow speed. A fiber optic cable first mechanically couples to a pipe and the signal is analysis in frequency-wavenumber (f-k) domain. By analysis the f-k output, the sound speed in the upstream and downstream travelling directions can be determined. The Doppler principle can be applied to extract the flow speed. Further, by processing low frequency thermal information from DAS, the thermal slug can be used to extract the flow speed. By comparing the speed of sound in different multiphase flow environment, it is possible to analyze fluid composition characteristics.

At step 453, a statistical-based model such as noise logging can be initiated. Next, at step 467, the production monitoring system calculates a sound pressure level from the noise logging. Subsequently, at step 468, a frequency level as a function of the sound pressure level, the flowrate of each phase and frequency can be determined from the flow loop. At step 469, the production monitoring system determines a volumetric flowrate of each phase in the reservoir condition. Next, at step 470, the production monitoring system then determines the flow allocation based on the surface rate and PVT (pressure-volume-temperature). An alternative method to obtain flow speed is to use statistical-based model such as noise logging. Various flow speed, fluid composition, completion design are performed in flow loop and a function of acoustic intensity with flow speed for various combinations and configurations can be determined using statistical method.

At step 454, temperature modeling can be initiated if the gas/liquid ratio is insensitive to SoS. Next, at step 471, the production monitoring system calculates a high-resolution temperature from DAS raw data. Subsequently, at step 472, the production monitoring system determines a volumetric flowrate in the reservoir condition. Next, at step 473, the production monitoring system then determines the flow allocation based on the surface rate and PVT (pressure-volume-temperature). The main limitation using DAS data only for multiphase flow is that Speed of Sound is not sensitive to a specific range of gas/liquid ratio. The DAS data and DTS data need to be coupled together to obtain high-resolution temperature data. For example. Joule-Thompson effect is the temperature change of gas or liquid when fluid is drawn from the reservoir to the wellbore. It has a cooling effect for gas and a heating effect for liquid. In this respect, the temperature model is built based on J-T effect to interpret multiphase phase fraction and bulk flow speed.

Figure 5:
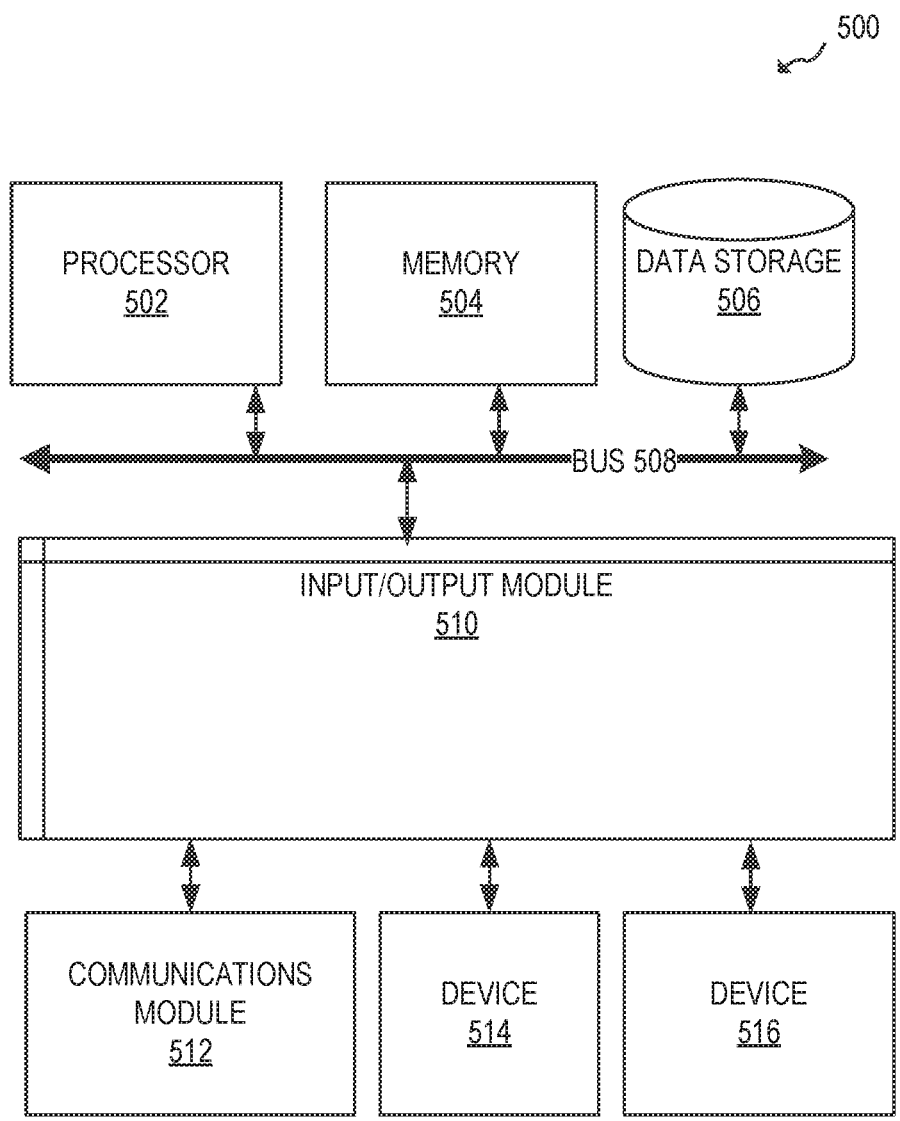
FIG. 5 is a block diagram illustrating an exemplary computer system with which the computing subsystem of FIGS. 1A-1C can be implemented.

FIG. 5 is a block diagram illustrating an exemplary computer system 500 with which the computing subsystem 118 of FIGS. 1A-1C can be implemented. In certain aspects, the computer system 500 may be implemented using hardware or a combination of software and hardware, either in a dedicated server, integrated into another entity, or distributed across multiple entities.

Computer system 500 (e.g., computing subsystem 118) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products. i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java. .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the computing subsystem 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in the memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component. e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone such as a smartphone.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

A system includes a distributed acoustic sensing subsystem that includes a first optical fiber for a distributed acoustic sensing signal, and a distributed temperature sensing subsystem that includes a second optical fiber for a distributed temperature sensing signal. The system also includes a cable positioned in a wellbore penetrating through one or more subterranean formations, the distributed acoustic sensing subsystem communicatively coupled to the cable through the distributed temperature sensing subsystem, wherein the cable includes one or more optical fibers used to obtain optical fiber measurements pertaining to the distributed acoustic sensing signal and the distributed temperature sensing signal, wherein the one or more optical fibers comprises a sensing fiber that is common between the distributed acoustic sensing subsystem and the distributed temperature sensing subsystem, wherein the distributed acoustic sensing subsystem receives at least a portion of the optical fiber measurements from the sensing fiber through the distributed temperature sensing subsystem.

A method includes deploying a cable into a wellbore penetrating one or more subterranean formations, the cable communicatively coupled to a distributed sensing subsystem positioned on a surface, the distributed sensing subsystem comprising a distributed acoustic sensing subsystem communicatively coupled to a common sensing fiber of the cable through a distributed temperature sensing subsystem. The method also includes obtaining a downhole measurement from the common sensing fiber. The method also includes determining a trigger event based on a change between the downhole measurement and a reference measurement, and initiating a predetermined workflow based on the determined trigger event. The method includes determining flow information in the wellbore based on the predetermined workflow.

A device includes one or more processors, and a computer-readable storage medium coupled to the one or more processors. The computer-readable storage medium includes instructions that, when executed by the one or more processors, cause the one or more processors to receive an optical fiber measurement obtained from a cable that is coupled to a distributed acoustic sensing subsystem multiplexed with a distributed temperature sensing subsystem, wherein the cable comprises a sensing fiber that is common between the distributed acoustic sensing subsystem and the distributed temperature sensing subsystem, determine a trigger event based on a change between the downhole measurement and a reference measurement, initiate a predetermined workflow based on the determined trigger event, and determine flow information in the wellbore based on the predetermined workflow.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A. B. and C" or "at least one of A, B. or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form. "from about a to about b," or, equivalently. "from approximately a to b," or, equivalently. "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A system comprising:
a distributed acoustic sensing subsystem that includes a first optical fiber for a distributed acoustic sensing signal;
a distributed temperature sensing subsystem that includes a second optical fiber for a distributed temperature sensing signal and a common reference coil; and
a cable positioned in a wellbore penetrating through one or more subterranean formations, the distributed acoustic sensing subsystem communicatively coupled to the cable through the common reference coil of the distributed temperature sensing subsystem, wherein the cable includes one or more optical fibers used to obtain optical fiber measurements pertaining to the distributed acoustic sensing signal and the distributed temperature sensing signal, wherein the one or more optical fibers comprises a sensing fiber coupled with the common reference coil, wherein the distributed acoustic sensing subsystem receives at least a portion of the optical fiber measurements from the common reference coil through the distributed temperature sensing subsystem.

2. The system of claim 1, wherein the distributed temperature sensing subsystem comprises a wavelength division multiplexer, wherein the wavelength division multiplexer multiplexes the distributed acoustic sensing signal and the distributed temperature sensing signal into a composite distributed temperature sensing signal.

3. The system of claim 1, wherein the distributed acoustic sensing subsystem is multiplexed with the distributed temperature sensing subsystem through the common reference coil.

4. The system of claim 1, further comprising:
a data acquisition system including a processor and a non-transitory computer readable medium, the distributed acoustic sensing subsystem and the distributed temperature sensing subsystem communicatively coupled to the data acquisition system, wherein the computer readable medium stores instructions that, when executed by the processor, cause the processor to:
obtain a downhole measurement from the optical fiber measurements;
determine a trigger event based on a change between the downhole measurement and a reference measurement;
initiate a predetermined workflow based on the determined trigger event; and
determine flow information in a wellbore penetrating one or more subterranean formations based on the predetermined workflow.

5. The system of claim 1, wherein the distributed acoustic sensing sub system comprises:
a circulator coupleable to a distributed acoustic sensing interrogator for routing a first optical signal from the distributed acoustic sensing interrogator through a first fiber connector to the one or more optical fibers positioned downhole in the wellbore and communicatively coupleable to an optical receiver of the distributed acoustic sensing subsystem for routing a reflective optical signal received from the one or more optical fibers to the optical receiver.

6. The system of claim 5, wherein the distributed temperature sensing sub system comprises:
a first wavelength division multiplexer coupleable to an optical transmitter for routing a second optical signal from the optical transmitter through a second fiber connector to the one or more optical fibers positioned downhole in the wellbore and communicatively coupleable to an optical receiver of the distributed temperature sensing subsystem for routing a reflective optical signal received from the one or more optical fibers to the first wavelength division multiplexer.

7. The system of claim 6, wherein the distributed temperature sensing subsystem comprises:
a second wavelength division multiplexer coupleable to the first wavelength division multiplexer and to the first fiber connector of the distributed acoustic sensing subsystem for routing the distributed temperature sensing signal from the first wavelength division multiplexer and the distributed acoustic sensing signal from the circulator to the one or more optical fibers positioned downhole in the wellbore through the common reference coil and for routing the reflective optical signal received from the one or more optical fibers to the optical receiver of the distributed temperature sensing subsystem through the first wavelength division multiplexer and to an optical receiver of the distributed acoustic sensing subsystem through the circulator.

8. The system of claim 7, wherein the common reference coil is coupled to the second wavelength division multiplexer and to a second fiber connector.

9. The system of claim 7, wherein the second wavelength division multiplexer separates one or more acoustic signals from one or more temperature signals in the reflective optical signal.

10. The system of claim 1, wherein the distributed acoustic sensing subsystem is coupled to a first fiber connector of the distributed temperature sensing subsystem and the cable is coupled to a second fiber connector of the distributed temperature sensing subsystem.

11. A method, comprising:
deploying a cable into a wellbore penetrating one or more subterranean formations, the cable communicatively coupled to a distributed sensing subsystem positioned on a surface, the distributed sensing subsystem comprising a distributed acoustic sensing subsystem communicatively coupled to a common sensing fiber of the cable through a common reference coil of a distributed temperature sensing subsystem;
obtaining a downhole measurement from the common sensing fiber;
determining a trigger event based on a change between the downhole measurement and a reference measurement;
initiating a predetermined workflow based on the determined trigger event; and
determining flow information in the wellbore based on the predetermined workflow.

12. The method of claim 11, wherein initiating the predetermined workflow comprises:
generating a production monitoring model associated with the wellbore; and
constraining the production monitoring model using the downhole measurement, wherein constraining the production monitoring model comprises:
measuring a change in optical path length using a low frequency component of a measured distributed acoustic sensing signal; and
compensating for the measured change in the optical path length using temperature data from a measured distributed temperature sensing signal.

13. The method of claim 11, further comprising:
obtaining distributed acoustic sensing signals and distributed temperature sensing signals from the common sensing fiber through the common reference coil at of the distributed temperature sensing subsystem; and
extracting acoustic data from the distributed acoustic sensing signals and temperature data from the distributed temperature sensing signals,
wherein the downhole measurement is obtained based on the acoustic data and the temperature data.

14. The method of claim 11, wherein the trigger event occurs in response to deviation from a steady-state condition in the wellbore or an active event generation on the surface, wherein determining the trigger event comprises:
obtaining the reference measurement from one or more surface or downhole measurements;
obtaining one or more predetermined event profiles for a type of the downhole measurement; and
determining that the downhole measurement correlates to the one or more predetermined event profiles.

15. The method of claim 11, wherein the downhole measurement is a distributed temperature measurement based on one or more of Rayleigh scattering, Brillouin scattering or Raman scattering, wherein determining the trigger event comprises determining a change between the distributed temperature measurement and the reference measurement that exceeds a predetermined threshold.

16. The method of claim 11, wherein the downhole measurement is a distributed interferometric measurement based on Rayleigh backscatter, wherein determining the trigger event comprises determining a change between the distributed interferometric measurement and the reference measurement that exceeds a predetermined threshold.

17. The method of claim 11, wherein the downhole measurement is a distributed vibration measurement based on Rayleigh backscatter, wherein determining the trigger event comprises determining a change between the distributed vibration measurement and the reference measurement that exceeds a predetermined threshold.

18. The method of claim 11, wherein the downhole measurement is a pressure measurement using one or more pressure sensors, wherein determining the trigger event comprises determining a change between the pressure measurement and the reference measurement that exceeds a predetermined threshold.

19. The method of claim 11, wherein:
the downhole measurement comprises a measured low frequency acoustic signal from the distributed acoustic sensing subsystem and a measured low frequency temperature signal from the distributed temperature sensing subsystem, and
initiating the predetermined workflow comprises:
modifying the measured low frequency acoustic signal using the measured low frequency temperature signal, the measured low frequency acoustic signal being modified to reduce a low frequency baseline drift in the measured low frequency acoustic signal; and
measuring a high resolution dynamic temperature measurement based on the modified measured low frequency acoustic signal and the measured low frequency temperature signal.

20. A device, comprising:
one or more processors;
a computer-readable storage medium coupled to the one or more processors, the computer-readable storage medium including instructions that, when executed by the one or more processors, cause the one or more processors to:
receive an optical fiber measurement obtained from a cable that is coupled to a distributed acoustic sensing subsystem multiplexed with a distributed temperature sensing subsystem, wherein the cable is positioned in a wellbore penetrating through one or more subterranean formations and the distributed acoustic sensing subsystem communicatively coupled to the cable through a common reference coil of the distributed temperature sensing subsystem, wherein the cable includes one or more optical fibers used to obtain optical fiber measurements pertaining to the distributed acoustic sensing signal and the distributed temperature sensing signal, wherein the one or more optical fibers comprises a sensing fiber coupled with the common reference coil, wherein the distributed acoustic sensing subsystem receives at least a portion of the optical fiber measurements from the common reference coil through the distributed temperature sensing subsystem;

determine a trigger event based on a change between the optical fiber measurement and a reference measurement;

initiate a predetermined workflow based on the determined trigger event; and determine flow information in a wellbore based on the predetermined workflow.

\* \* \* \* \*